US006996291B2

(12) United States Patent
Nahum

(10) Patent No.: US 6,996,291 B2
(45) Date of Patent: Feb. 7, 2006

(54) SYSTEMS AND METHODS FOR CORRELATING IMAGES IN AN IMAGE CORRELATION SYSTEM WITH REDUCED COMPUTATIONAL LOADS

(75) Inventor: Michael Nahum, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 659 days.

(21) Appl. No.: 09/921,711

(22) Filed: Aug. 6, 2001

(65) Prior Publication Data

US 2003/0026457 A1 Feb. 6, 2003

(51) Int. Cl.
*G06K 9/64* (2006.01)

(52) U.S. Cl. ...................... 382/278; 396/128; 704/217; 704/237; 704/263; 359/306; 708/5; 708/426

(58) Field of Classification Search ................ 382/278, 382/100, 106, 277; 396/128, 125; 704/217, 704/200, 213, 216, 218, 237, 263; 367/37–39; 359/306; 708/5, 422, 426; 356/3, 614
See application file for complete search history.

(56) References Cited

U.S. PATENT DOCUMENTS

| | | | | | |
|---|---|---|---|---|---|
| 4,671,650 | A | * | 6/1987 | Hirzel et al. | 356/28 |
| 4,967,093 | A | * | 10/1990 | Takemori | 250/559.2 |
| 5,453,840 | A | * | 9/1995 | Parker et al. | 356/400 |
| 5,619,596 | A | * | 4/1997 | Iwaki et al. | 382/278 |
| 5,686,720 | A | * | 11/1997 | Tullis | 250/208.1 |
| 6,067,367 | A | * | 5/2000 | Nakajima et al. | 382/103 |
| 6,141,578 | A | | 10/2000 | Hardy | |
| 6,589,634 | B2 | | 7/2003 | Schultz et al. | |
| 6,683,984 | B1 | | 1/2004 | Simske et al. | |
| 6,754,367 | B1 | | 6/2004 | Ito et al. | |

FOREIGN PATENT DOCUMENTS

| | | |
|---|---|---|
| EP | 0 254 644 A2 | 1/1988 |
| EP | 0 347 912 A2 | 12/1989 |
| GB | 2 222 499 | 3/1990 |

OTHER PUBLICATIONS

Schreier et al., "Systematic errors in digital image correction caused by intensity interpolation", *Photo-Optical Instrumental Engineering*, Nov., 2000, pp. 2915-2921.

* cited by examiner

*Primary Examiner*—Samir Ahmed
*Assistant Examiner*—Anand Bhatnagar
(74) *Attorney, Agent, or Firm*—Oliff & Berridge, PLC

(57) ABSTRACT

After one or both of a pair of images are obtained, an auto-correlation function for one of those images is generated to determine a smear amount and possibly a smear direction. The smear amount and direction are used to identify potential locations of a peak portion of the correlation function between the pair of images. The pair of images is then correlated only at offset positions corresponding to the one or more of the potential peak locations. In some embodiments, the pair of images is correlated according to a sparse set of image correlation function value points around the potential peak locations. In other embodiments, the pair of images is correlated at a dense set of correlation function value points around the potential peak locations. The correlation function values of these correlation function value points are then analyzed to determine the offset position of the true correlation function peak.

26 Claims, 16 Drawing Sheets

SYSTEMS AND METHODS FOR CORRELATING IMAGES IN AN IMAGE CORRELATION SYSTEM WITH REDUCED COMPUTATIONAL LOADS

BACKGROUND OF THE INVENTION

1. Field of Invention

This invention is directed to image correlation systems.

2. Description of Related Art

Various known devices use images acquired by a sensor array, and correlation between images acquired by the sensor array, to determine deformations and/or displacements. For example, one class of such devices is based on acquiring a speckle image generated by illuminating an optically rough surface with a light source. Generally, the light source is a coherent light source, such as a laser-generating light source. Such laser-generating light sources include a laser, laser diode and the like. After the optically rough surface is illuminated by the light source, the light scattered from the optically rough surface is imaged onto an optical sensor. The optical sensor can be a charge-couple device (CCD), a semi-conductor image sensor array, such as a CMOS image sensor array, or the like.

Prior to displacing or deforming the optically rough surface, a first initial speckle image is captured and stored. Then, after displacing or deforming the optically rough surface, a second or subsequent speckle image is captured and stored. Conventionally, the first and second speckle images are then compared in their entireties on a pixel-by-pixel basis. In general, a plurality of comparisons are performed. In each comparison, the first and second speckle images are offset, or spatially translated, relative to each other. Between each comparison, the amount of offset, or spatial translation, is increased by a known amount, such as one image element, or pixel, or an integer number of image elements or pixels.

In each comparison, the image value of a particular pixel in the reference image is multiplied by, subtracted from, or otherwise mathematically used in a function with, the image value of the corresponding second image pixel, where the corresponding second image pixel is determined based on the amount of offset. The value resulting from each pixel-by-pixel operation is accumulated with values resulting from the operation performed on every other pixel of the images to determine a correlation value for that comparison between the first and second images. That correlation value is then, in effect, plotted against the offset amount, or spatial translation position, for that comparison to determine a correlation function value point. The offset having the greatest correlation between the reference and first images will generate a peak, or a trough, depending on how the pixel-by-pixel comparison is performed, in the plot of correlation function value points. The offset amount corresponding to the peak or trough represents the amount of displacement or deformation between the first and second speckle images.

U.S. Pat. No. 6,642,509, which is incorporated herein by reference in its entirety, discloses a variety of different embodiments of a speckle-image-based optical transducer. As disclosed in the 264 application, such image-based correlation systems can move the surface being imaged relative to the imaging system in one or two dimensions. Furthermore, the surface being imaged does not need to be planar, but can be curved or cylindrical. Systems having two dimensions of relative motion between the surface being imaged and the imaging system can have the surface being imaged effectively planar in one dimension and effectively non-planar in a second dimension, such as, for example, a cylinder which can rotate on its axis passed the imaging systems, while the cylindrically surface is translated past the imaging system along its axis.

U.S. Pat. No. 6,873,422, which is incorporated herein by reference in its entirety, discloses systems and methods for high-accuracy displacement determination in a correlation-based position transducer. In the 671 application, a system is provided that estimates the sub-pixel displacement of images in correlation-based position transducers and the like. The system then rejects the systematic displacement estimation errors present when conventional sub-pixel estimation methods are applied to a number of correlation function value points, especially when the correlation function value points are arranged asymmetrically.

However, in the above-described conventional image correlation systems, the computational loads required to determine the correlation function value over the entire image for each offset position are often extremely high. Accordingly, in "Hierarchical Distributed Template Matching" by M. Hirooka et al., *Machine Vision Applications and Industrial Inspection V*, Proceedings of SPIE, Feb. 10–11, 1997, San Jose, Calif., and "Coarse-Fine Template Matching" by A. Rosenfeld et al., in *IEEE Transactions on Systems, Man and Cybernetics*, pages 104–107, February 1977, various techniques are described that reduce the computational load by reducing the resolution of the images to be correlated. In particular, in both of these papers, the image resolution is reduced by averaging the image values of a number of pixels to create a "shrunken" image having a reduced number of pixels. The image correlation is then performed on a pixel-by-pixel basis for each offset position for the reduced resolution images. Once the general area of the greatest correlation is identified, the original, full-resolution images are compared on a pixel-by-pixel basis for each offset position in this area only.

Similarly, in "A Two-Stage Cross Correlation Approach To Template Matching" by A. Goshtasby et al., *IEEE Transactions on Pattern Analysis and Machine Intelligence*, Vol. 6, No. 3, May 1984, a different two-stage technique is disclosed. In this paper, rather than reducing the resolution of the entire image, as in Rosenfeld et al. and Hirooka et al., a limited number of the pixels in the images to be correlated are compared for every image offset position to generate a correlation function. Like Hirooka et al. and Rosenfeld et al., a reduced number of pixels are used in the comparison. However, unlike Hirooka et al. and Rosenfeld et al., the pixels used are at full resolution but do not represent the entire image to be compared. As in Hirooka et al. and Rosenfeld et al., in this technique, once an area of high correlation is identified using the reduced number of pixels only, that area is further analyzed using all of the pixels of the images to be compared for each offset position.

In contrast to the reduced resolution technique disclosed in Hirooka et al. and Rosenfeld et al., and in contrast to the limited portion of the full resolution image technique used in Goshtasby et al., in "Advances in Picture Coding" by H. G. Musmann et al., *Proceedings of the IEEE*, Vol. 73, No. 4, April 1985, pages 523–548, two techniques are discussed that search a number of coarsely-spaced search points around a center search point. At each such search point, a full image correlation value is determined. Then, some analysis of the obtained correlation values is performed. These analyses generally indicate the direction of the correlation peak or trough relative to the coarsely-spaced search points. The coarsely-spaced search point that lies closest to the direction of the correlation peak or trough is then selected as the center point around which a further number of coarsely-spaced search points will be selected. This procedure proceeds iteratively until the correlation peak or trough is identified. However, at no time is any reduced representation of the images such as those disclosed in Hirooka et al., Rosenfeld et al. or Goshtasby et al. used. Likewise, while the techniques disclosed in Musmann et al. collapse the sparsely spaced search points around the central point as the central point approaches the correlation peak or trough, each iteration uses the same number of coarsely-spaced points.

SUMMARY OF THE INVENTION

In all of Hirooka et al., Rosenfeld et al., Goshtasby et al. and Musmann et al. described above, the disclosed techniques are useful for low spatial frequency grayscale images, low spatial frequency maps, and low spatial frequency video images. However, the resolution reduction or averaging techniques disclosed in Hirooka et al. and Rosenfeld et al. are generally inapplicable to high spatial frequency images, such as speckle images, images resembling surface texture, and high density dot patterns and the like. This is because such resolution, reduction or spatial averaging tends to "average-out" or remove the various spatial features which are necessary to determine an accurate correlation value in such high spatial frequency images.

In a similar vein, the subtemplate created by taking a set of N randomly selected data points from a template with $N^2$ data points, as disclosed in Goshtasby et al., is also inapplicable to such high spatial frequency images. In the low-spatial-frequency images used in Goshtasby et al., each randomly selected data point (or pixel value) is likely to be substantially similar in image value to the surrounding data points (or pixel values). Thus, each data point contributes substantially the same amount to the correlation value. In contrast, in high-spatial-frequency images, such as speckle images, the image value of each pixel is likely to be significantly different than the image values of the adjacent pixels. As a result, if the pixels to be used in the first stage of the image correlation process are randomly selected in such high-spatial frequency images, the resulting image correlation value for the actual offset position is likely to be indistinguishable from the image correlation values for other offset amounts.

The coarsely-spaced search point techniques discussed in Musmann et al. are also generally inapplicable to such high-spatial-frequency images. In particular, such high-spatial-frequency images will generally have a "landscape" of the correlation function that is substantially flat or regular within a substantially limited range away from the actual offset position and substantially steep or irregular only in offset positions that are very close to the actual offset position. That is, for offset positions away from the actual offset position, the correlation value will vary only in a regular way and within a limited range from an average value, except in a very narrow range around the actual offset position. In this very narrow range around the actual offset position, the correlation value will depart significantly from the other regular variations and their average value.

In contrast, the coarsely-spaced search point techniques disclosed in Musmann et al. rely on the "landscape" of the correlation function having a significant gradient indicative of the direction of the correlation peak at all points. This allows an analysis of any set of coarsely-spaced search points to clearly point in the general direction of the correlation function peak or trough. However, applying the coarsely-spaced search techniques disclosed in Musmann et al. to a correlation function having a substantially flat or regular landscape except around the correlation peak or trough will result in no clear direction towards the correlation function peak or trough being discernible, unless one of the coarsely-spaced search points happens to randomly fall within the very narrow range of correlation values that depart from the regular variations and their average value. However, as should be appreciated by those skilled in the art, this has a very low probability of occurring in the particular coarsely-spaced search point techniques disclosed in Musmann et al.

Thus, the inventor has determined that high-resolution imaging systems and/or image correlation systems that allow for displacement along two dimensions still consume too large a portion of the available system resources when determining the correlation values for every positional displacement or offset. Additionally, even systems that allow for relative displacement only along one dimension would also benefit from a reduction in the amount of system resources consumed when determining the correlation displacement.

Accordingly, there is a need for systems and methods which are able to accurately to determine the peak or trough of the correlation function while reducing the amount of system resources needed to perform the correlation operations.

This invention provides systems and methods that accurately allow the location of a correlation peak or trough to be determined.

This invention further provides systems and methods that allow the location of the correlation peak or trough to be determined while consuming fewer system resources than conventional prior art methods and techniques.

This invention separately provides systems and methods for accurately determining the location of the correlation peak or trough while sparsely determining the correlation function.

This invention further provides systems and methods that allow the location of the correlation peak or trough to be determined for a two-dimensional correlation function using a grid of determined correlation values.

This invention separately provides systems and methods for accurately determining the location of the correlation peak or trough for a pair of high-spatial-frequency images.

This invention separately provides systems and methods for accurately determining the location of the correlation peak or trough for images that have correlation function landscapes that are substantially flat or regular in regions away from the correlation peak or trough.

This invention separately provides systems and methods for accurately determining the location of the correlation peak or trough while sparsely determining the correlation function for a subset of the image to be correlated.

This invention further provides systems and methods that identify a portion of the correlation function in which the correlation peak or trough is likely to lie without performing a correlation operation between the first and second image.

This invention separately provides systems and methods that allow a magnitude and/or direction of movement to be estimated from a single image captured by the image correlation system.

This invention further provides systems and methods for refining the estimated displacement distance or offset and/or direction on an analysis of only the second captured image.

This invention additionally provides systems and methods that use the determined and/or refined displacement distance and/or direction values to identify a portion of the correlation function in which the correlation peak is likely to lie.

This invention separately provides systems and methods that determine a magnitude and/or a direction of relative motion between the surface to be imaged and the imaging system based on auto-correlation of the first and/or second images.

This invention further provides systems and methods for determining the magnitude and/or direction of relative motion based on at least one characteristic of the auto-correlation peak.

This invention separately provides systems and methods that are especially suitable for measuring displacement of a surface using speckle images.

The systems and methods according to this invention will be described with respect to sensor "images", where the term "image" is not limited to optical images, but refers more generally to any one-dimensional, two-dimensional, or higher-dimensional, arranged set of sensor values. Similarly, the term "pixel" as used herein is not limited to optical picture elements, but refers more generally to the granularity of the one-dimensional, two-dimensional or higher-dimensional arranged set of sensor values. It should be appreciated that the term "image" is not limited to entire images but refers more generally to any image portion that includes a one-dimensional, two-dimensional, or higher-dimensional arranged set of sensor values.

In various exemplary embodiments of the correlation systems and methods according to this invention, after the first and second correlation images are obtained, signal generating and processing circuitry begins performing the correlation function using the first and second images to determine a sparse set of image correlation function value points. In such exemplary embodiments where the surface to be imaged moves only on a one-dimensional path relative to the imaging system, the sparse set of image correlation function value points are taken along only a single dimension. In contrast, in various exemplary embodiments that allow for relative movement along two dimensions, the sparse sample set of image correlation function value points form a grid in the two-dimensional correlation function space.

In general, in various exemplary embodiments, the width of the correlation peak is relatively small relative to the length or width of the imaging array along the single dimension in a one-dimensional system or along each of the two dimensions in a two-dimensional system have imaging arrays. In general, in these various exemplary embodiments, the value of the correlation function in areas away from the correlation peak generally varies only within a limited range away from an average value. It should be appreciated that the sparse set of image correlation function value points can be as sparse as desired so long as the location of the correlation peak can be identified to a first, relatively low resolution, without having to determine the correlation function value for every possible displacement distance or offset.

For a high-spatial-frequency, non-repetitive image, where the frequency of the spatial features in the captured image is on the order of the dimensions of the pixels of the image capturing system, the correlation function will have, in general, a single, unique, peak or trough. As a result, as shown in FIGS. 3, 5 and 7–9, except in the area immediately surrounding the correlation peak or trough, the correlation function will have generally the same background or average value. Thus, any correlation function value that occurs in sparse set of image correlation function value points that departs substantially from a limited range around the average background value tends to identify the peak in such images.

In contrast, in any type of repetitive image, multiple peaks, each having the same size, will be created. Because such images do not have a uniquely extreme correlation function peak and/or trough, the sparsely determined correlation function according to this invention cannot be reliably used on such images. Finally, with respect to non-repetitive images that have features having spatial frequencies that are significantly lower than the spatial resolution of the image array, any number of irregular local peaks or troughs, in addition to the true correlation peak or trough, can occur in the image correlation function. As such, the background value is reliably representative of a particular portion of the correlation function and any correlation position having an image value that significantly departs from the background value of the image correlation function identifies at least a local peak or trough in the image correlation function space.

It should be appreciated that, in various exemplary embodiments, the image correlation value determined at one of the image correlation function value points of the sparse set of image correlation function value points locations can be a full pixel-by-pixel correlation over the entire two-dimensional extent of the first and second images. However, since it is highly unlikely one of the sparse set of image correlation function value points locations is the true peak or trough of the correlation function, such accuracy is unnecessary. As a result, in various other exemplary embodiments, only one, or a small number, of the rows and/or columns of the first and second images are correlated to each other.

This does not result in an image correlation value that is as accurate as possible. However, because the sampling location is used merely to indicate where further, more precise analysis should be performed, this lack of precision can be ignored, especially in light of the significant reduction in the amount of system resources required to determine the correlation function value for this sample location in these exemplary embodiments. This is especially true when the current sampling location is one of a two-dimensional grid over the two-dimensional correlation space that occurs when the surface to be imaged can move in two dimensions relative to the image system.

In various exemplary embodiments, at least one correlation peak or trough is identified for the image correlation function. Then, all of the image correlation sampling locations in the correlation function space within a predetermined distance, or within dynamically determined distance, to each such peak or trough location are determined. The determined image correlation sampling locations are analyzed to identify the displacement point having the image correlation value that is closet to the true peak or trough of the image correlation function. Again, it should be appreciated that, in some exemplary embodiments, this correlation can be performed in full based on a pixel-by-pixel comparison of all of the pixels in the first and second images.

Alternatively, in various other exemplary embodiments, the image correlation values for these image correlation locations surrounding the sparsely-determined peak or trough can be determined using the reduced-accuracy and reduced-system-resource-demand embodiment discussed above to again determine, at a lower resolution, the location in the image correlation space that appears to lie closest to the true peak or trough of the image correlation function. Then, for those locations that are within a second predetermined distance, or within a second dynamically determined distance, a more accurately determined image correlation peak or trough, the actual image correlation peak or trough can be identified as outlined in the 671 application.

It should be appreciated that, in the exemplary embodiment outlined above, where the surface to be imaged has a non-repetitive but low-spatial-frequency image on that surface, each of these embodiments would be performed on each such identified peak or trough to determine the location of the actual correlation function peak or trough.

In various other exemplary embodiments, in one or two-dimensional movement systems, rather than taking a sharp or distinct, i.e., "unsmeared", image by using a high effective "shutter speed" for the imaging system, "smeared" images can be obtained by using a slow shutter speed. Because the surface to be imaged will move relative to the imaging system during the time that the shutter is effectively open, the resulting smeared images will have the long axes of the smeared image features aligned with the direction of relative movement between the surface to be imaged and the imaging system. Additionally, the lengths of the long axes of the smeared image features, relative to the axes of the same features obtained along the direction of motion using a high shutter speed, is closely related to the magnitude of the motion, i.e., the velocity, of the surface to be imaged relative to the optical system.

It should be appreciated that, for a one-dimensional system, the directional information is unnecessary, as by definition, the system is constrained to move only along a single dimension. In this case, the magnitude of the smear can be determined using the width of the correlation peak obtained by auto-correlating the smeared image with itself. The direction of the velocity vector can also be determined through auto-correlating the captured image with itself. This is also true when the direction of relative motion is substantially aligned with one of the axes of the imaging array in a two-dimensional system.

Once the direction and magnitude of the relative motion are determined, that information can be used to further reduce the number of sparse sampling locations of the correlation function space to be analyzed, i.e., the number of image correlation function value points in the sparse set of image correlation function value points.

Furthermore, if additional magnitude and direction information is obtained by auto-correlation from the second image, the accuracy of the direction and magnitude and components of the velocity vector can be further refined.

In various other exemplary embodiments of the correlation systems and methods according to this invention, the systems and methods are particularly well-suited for application to speckle images, texture images, high-density dot images and other high-spatial frequency images.

In various other exemplary embodiments of the correlation systems and methods according to this invention, the systems and methods are particularly well-suited to determining the general area within a two-dimensional correlation function space to reduce the load on the system resources while determining the location of the peak of the correlation function at high speed with high accuracy.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
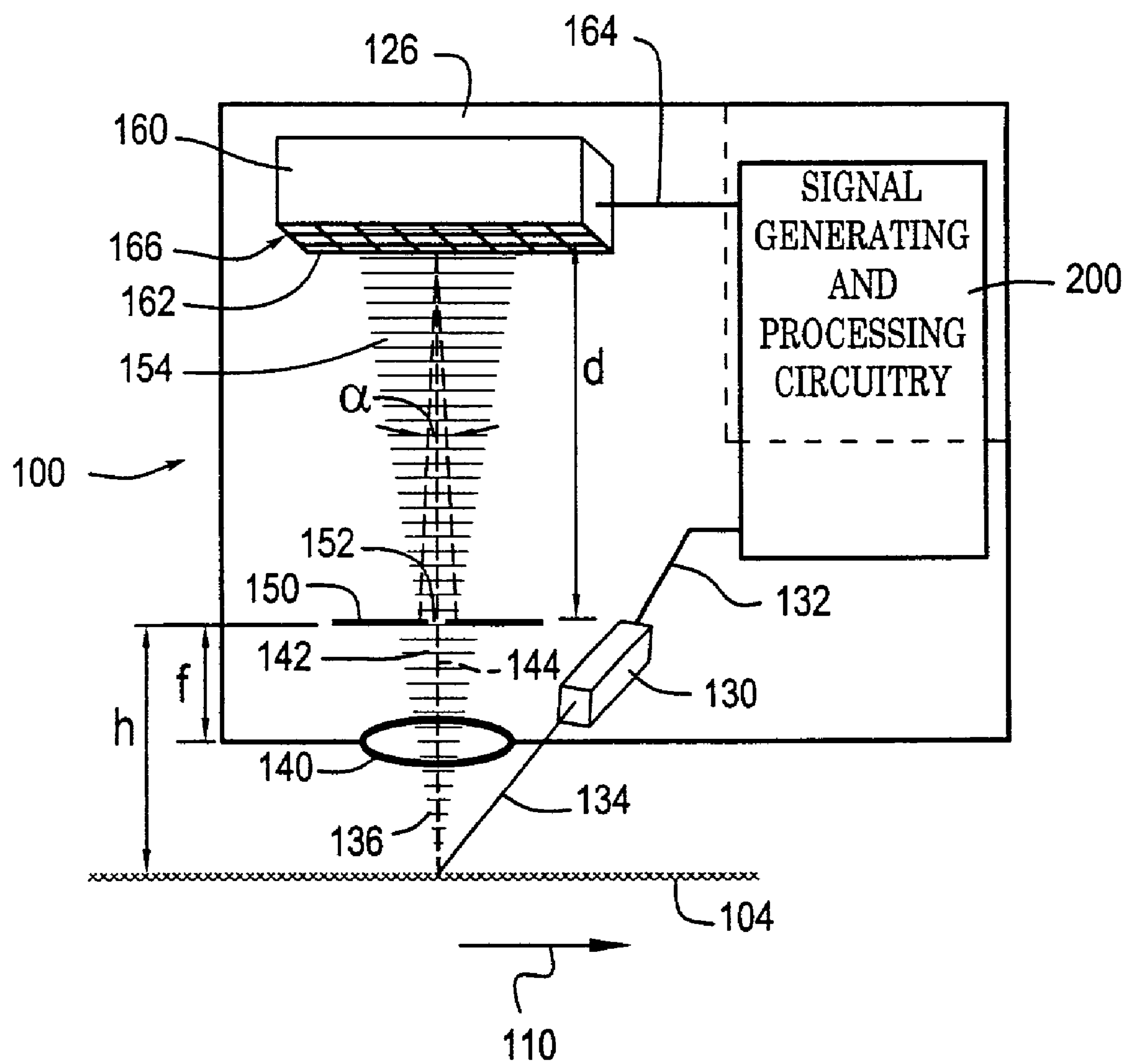
FIG. 1 is a block diagram of a speckle-image correlation optical position transducer.

FIG. 1 is a block diagram of a correlation-image-based optical position transducer 100. It should be appreciated that, in the following detailed description, the systems and methods according to this invention will be described primarily relative to a speckle-image-based optical position transducer and corresponding methods and techniques. However, it should be appreciated that the systems and methods according to this invention are not limited to such speckle-image-based correlation systems and methods. Rather, the systems and methods according to this invention can be used with any known or later-developed system or method for determining a positional displacement or offset that uses any known or later developed type of correlation image, including texture images, high-density dot images and the like, so long as the correlation image has a high spatial frequency and/or is not truly repetitive. Thus, while the following detailed description of the exemplary embodiments may refer in particular to speckle-image-based optical positions transducers, correlation systems and/or correlation techniques, this is exemplary only and is not limiting of the full scope and breadth of this invention.

Herein, the offset value in pixels associated with the extremum of a true continuous correlation function will be called the peak offset regardless of whether the underlying correlation function produces a peak or a trough, and the surface displacement corresponding to the peak offset will be called the peak displacement, or simply the displacement, regardless of whether the underlying correlation function produces a peak or a trough. In particular, the correlation functions shown in FIGS. 3 and 5, which have correlation function values displayed in arbitrary units, will exhibit an extremum of the true continuous correlation function 205 at the offset value, or spatial translation position, where the image, or intensity, patterns in each of the first and second images best align.

The speckle-image-based optical position transducer 100 shown in FIG. 1 includes a readhead 126, signal generating and processing circuitry 200 and an optically rough surface 104. In FIG. 1, the components of the readhead 126, and their relation to the optically rough surface 104, are shown schematically in a layout that generally corresponds to an exemplary physical configuration, as further described below. The correlation-image-based optical position transducer 100 that uses speckle images, as well as various suitable mechanical and optical configurations, image correlation methods, and associated signal processing circuitry, are described in greater detail in the incorporated 264 application.

In particular, the optically diffusing, or optically rough, surface 104 is positioned adjacent to an illuminating and receiving end of the readhead 126, such that when optically rough surface 104 is illuminated by light emitted from that end of the readhead 126 by a light source 130, the emitted light is scattered back from the optically rough surface 104 towards the image receiving optical elements positioned at that end of the readhead 126. The optically rough surface 104 may be part of a specially-provided element, or it may be provided as an integral surface of a separately-existing mechanism.

In either case, the optically rough surface 104 is positioned at a generally stable distance from the light source and an optical system housed in the readhead 126, and moves relative to readhead 126 along one or two axes of relative motion, such as the measuring axes 110 and 112 in FIG. 1. When motion in two dimensions is allowed, there are usually no constraints on the permitted motion within the lateral bounds of the two-dimensional area of the optically rough surface 104. When only a single dimension of relative motion is permitted, the relative motion is generally constrained along one of the measuring axes 110 or 112 by conventional guideways or bearings (not shown) mounted to a frame that maintains the proper relative position between the readhead 126 and the optically rough surface 104. The readhead 126 may include an alignment feature (not shown) which aids in mounting the readhead 126, and aligns the internal components of the readhead 126 relative to the mounting frame and/or the expected axis or axes of relative motion of the optically rough surface 104.

As shown in FIG. 1, the image receiving optical elements of the readhead 126 include a lens 140 positioned at the illuminating and receiving end of the readhead assembly 106 such that the optical axis of the lens 140 is generally aligned with the illuminated spot on the optically rough surface 104. The readhead 126 further includes a pinhole aperture plate 150, spaced apart from the lens 140 along an optical axis, and a light detector 160 spaced apart from the aperture plate 150 along the optical axis, as shown in FIG. 1. The light detector 160 can be any known or later-developed type of light sensitive material or device that can be organized into an array of independent and individual light sensing elements, such as a camera, an electronic or digital camera, a CCD array, an array of CMOS light sensitive elements, or the like.

An exemplary spacing and positioning of the optically rough surface 104 and the readhead 126, including the lens 140, the aperture plate 150, and the light detector 160, is further described below and in the incorporated 264 application. The mounting of the light source 130, the lens 140, the aperture plate 150, and the light detector 160 in the housing of the readhead 126 may be done according to conventional methods of miniature optical system construction and/or industrial camera construction, so long as the components are mounted in a precise and stable manner.

When the readhead 126 is suitably positioned adjacent to the optically rough surface 104, each image captured by the light detector 160 will contain a random pattern of relatively bright spots, or speckles, where the diffracted light waves from the optically rough surface 104 combine positively to form a peak, and relatively dark spots where the diffracted light waves from the optically rough surface 104 combine negatively to cancel out. The random pattern corresponding to any illuminated portion of the optically diffusing, or optically rough, surface 104 is unique. The optically rough surface 104 can therefore act as a displacement reference without the need for any special marks.

The light detector 160 has an array 166 of image elements 162 spaced apart along at least one axis at a known spacing. The known spacing provides the basis for measuring the displacement or offset between two images projected onto the light detector 160, and thus also provides the basis for measuring the displacement of the surface that determines the images, i.e., the optically rough surface 104.

In general, however, the array 166 will extend in two dimensions along two orthogonal axes at a known spacing along each axis. This known spacing need not be the same for both axes. For systems that permit movement along only a single axes, the array 166 will often have an extent along that dimension that is much greater than the extent of the array 166 across that dimension. For systems that permit two-dimensional movements, the extent of the array 166 along each of the two orthogonal will be roughly on the same order of magnitude, but need not be exactly the same.

In addition, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below, with respect to FIGS. 18 and 19.

Additional details regarding the structure and operation of this and other embodiments of the speckle-image-based optical position transducer 100 are provided below, and in the incorporated 264 application.

As shown in FIG. 1, a light beam 134 is emitted by the light source 130 and is directed onto the optically diffusing, or optically rough, surface 104 to illuminate a portion of the optically diffusing, or optically rough, surface 104. As a result, the illuminated portion of the optically diffusing, or optically rough, surface 104 both scatters and diffracts light about the optical axis 144.

When the light source 130 is a white-light source, the light will generate an image of the illuminated portion, which can be projected onto the array 166 of the image elements 162. However, while this image can be correlated in the same way that a speckle image can be correlated, this image will not include speckles formed by scattering from the optically diffusing, or optically rough, surface 104.

When the light source 130 is coherent and is driven by the drive signal on the signal line 132 and outputs the light beam 134 as a coherent light beam, the coherent light beam 134 illuminates a portion of the optically diffusing, or optically rough, surface 104. The illuminated portion lies along the optical axis 144 of the optical system of the readhead 126. In particular, the light 136 scattered from the illuminated portion of the optically diffusing, or optically rough, surface 104 is gathered by the lens 140.

The lens 140 then projects the collected light 142 from the illuminated portion of the optically diffusing, or optically rough, surface 104 onto the pinhole aperture plate 150 having the pinhole aperture 152. The lens 140 is spaced from the plate 150 by a distance f, which is equal to the focal length of the lens 140. The pinhole aperture plate 150 is spaced from the illuminated portion of the optically diffusing, or optically rough, surface 104 by a distance h.

By locating the plate 150 at the focal distance f of the lens 140, the optical system of the speckle-image-based optical position transducer becomes telecentric. Moreover, by using the pinhole 152 in the pinhole plate 150, the speckle size and the dilation of the speckle pattern depends solely on the dimensions of the pinhole 152 and, more particularly, becomes independent of any lens parameters of the lens 140.

The collected light 142 from the lens 140 passes through the pinhole 152. In particular, the light 154 passed by the pinhole 152 is projected along the optical axis 144 and onto the array 166 of the image elements 162 of the light detector 160. The surface of the array 166 of the light sensitive elements 162 is separated from the plate 150 by a distance d. The speckle size depends only on the angle α subtended by the dimensions of the pinhole 152 and the distance d between the pinhole plate 150 and the surface formed by the array 166 of image elements 162 of the light detector 160.

The approximate size D of the speckles within the detected portion of the light received from the illuminated portion of the optically diffusing, or optically rough, surface 104 onto the array 166 of the image elements 162 is:

$$D \sim \lambda/\tan(\alpha) = (\lambda * d)/w \quad (1)$$

where:

λ is the wavelength of the light beam 134;

d is the distance between the pinhole plate 150 and the surface of the array 166;

w is the diameter of a round pinhole 152; and

α is the angle subtended by the dimension w at a radius equal to distance d.

In various exemplary embodiments, typical values for these parameters of the optical position transducer 100 include: $\lambda=0.6\ \mu m$, d=10 cm ($10^5\ \mu m$), and w=1 mm ($10^3\ \mu m$). As a result, the approximate speckle size D is 60 μm.

To achieve high resolution, the average speckle size is most usefully approximately equal to, or slightly larger than, the pixel size of the image elements 162 of the light detector 160. Moreover, in various embodiments of the readhead 126, the average speckle size is approximately two times to ten times the pixel spacing of the image elements 162.

To acquire an image, the signal generating and processing circuitry 200 outputs a drive signal on the signal line 132 to drive the coherent light source 130 to emit the coherent light beam 134. The light beam 134 illuminates a portion of the optically rough surface 104, which is imaged onto the array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine a displacement of the optically rough surface 104 between any two images, the signal portions for a first image received from the light detector 160 by the signal generating and processing circuitry 200 are stored in memory. A short time later, the signal generating and processing circuitry 200 again drives the coherent light source 130 and inputs a second image signal from the light detector 160 over the signal line 164. Generally, the second image must be generated and acquired within a short time period after the first image is acquired, depending on the displacement speed of the optically rough surface 104 relative to the light detector 160. The time period must be short enough to insure that the first and second images "overlap" sufficiently. That is, the time period must be short enough to insure that a pattern of image values present in the first image is also present in the second image, so that a significant correlation between the two images can be determined.

The first image and the second, or displaced, image are processed to generate a correlation function. In practice, the second image is shifted digitally relative to the first image over a range of offsets, or spatial translation positions, that includes an offset that causes the pattern of the two images to substantially align. The correlation function indicates the degree of pattern alignment, and thus indicates the amount of offset required to get the two images to align as the images are digitally shifted.

Figure 2:
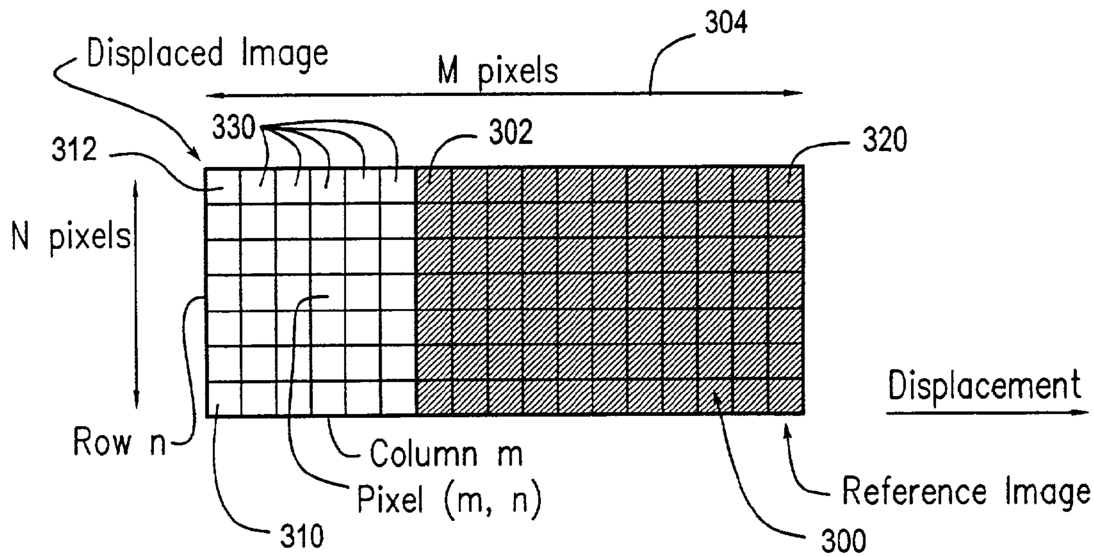
FIG. 2 illustrates the relationship between a first image and a current second image and the portions of the first and second images used to generate the correlation values according to a conventional comparison technique.
Figure 4:
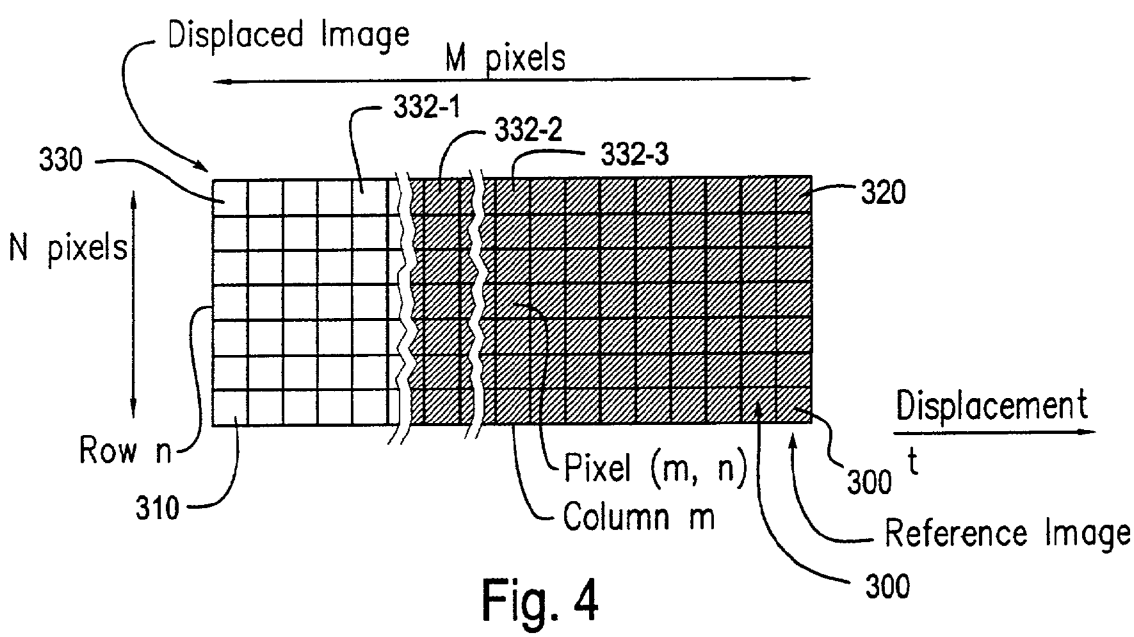
FIG. 4 illustrates the relationship between the first and second images and the portions of the first and second images used to generate the correlation values according to a first exemplary embodiment of a sparse set of image correlation function value points comparison technique according to this invention.
Figure 6:
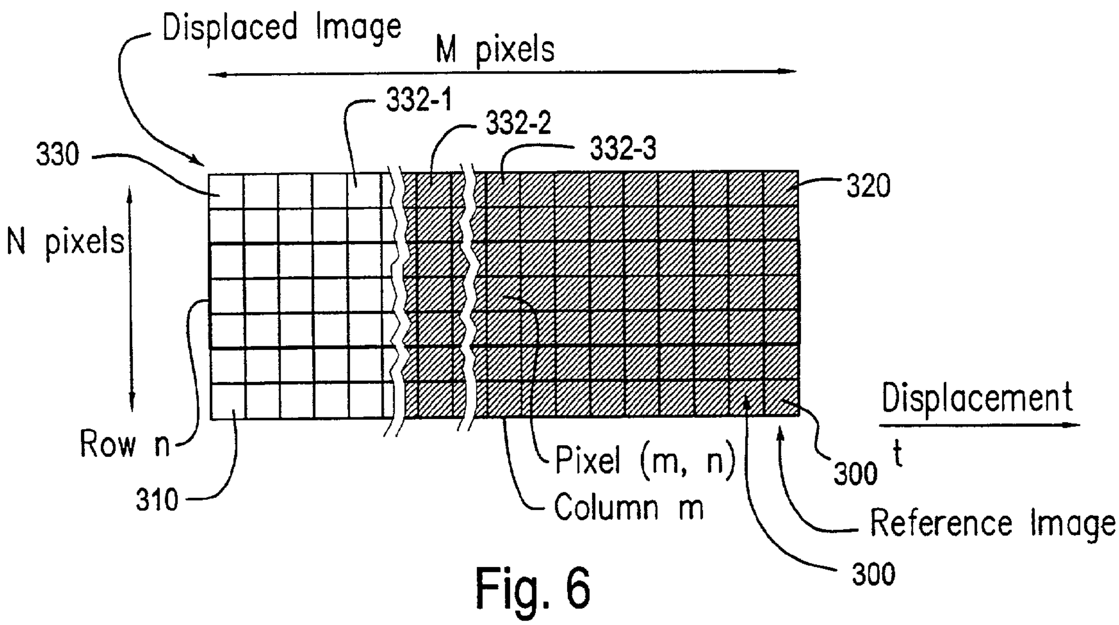
FIG. 6 illustrates the relationship between the first and second images and the portions of the first and second images used to generate the correlation values according to a second exemplary embodiment of a sparse set of image correlation function value points comparison technique according to this invention.

FIGS. 2, 4 and 6 illustrate one exemplary embodiment of the pixel structure of a reference image 300 and a displaced image 310 that are obtained by moving a surface to be imaged, such as the optically rough surface 104, past an image capture system, such as the light detector 160, along a single dimension 304. That is, the offset of the displaced image 310 relative to the reference image 300 occurs along only a single dimension. As shown in FIGS. 2, 4 and 6, each of the reference image 300 and the displaced image 310 is organized into a plurality of rows 320 and a plurality of columns 330. It should be appreciated that there are a number of different techniques for comparing the first image to the second image. For example, as shown in FIG. 2, in a convention technique, the entire frame of the current second image is compared, on a pixel-by-pixel basis, to the entire frame of the first image to generate each single correlation value.

Thus, as shown in FIG. 2, in a conventional technique, the displaced image 310 is first compared to the reference image 300 at a first offset position. In this offset position, the left and right edges of the displaced image 310 are aligned with the left and right edges of the reference image 300. At this offset position, a correlation function value is determined by comparing each of the pixels 302 of the reference image 300 with the corresponding pixel 312 of the displaced image 310. Then, the displaced image 310 is moved by one pixel along the displacement direction 304 relative to the reference image 300. Again, for this offset position, each of the pixels 312 of the displaced image 310 is compared to the corresponding pixel 302 of the reference image 300 for that offset position. The series of correlation values that is generated by shifting the second image by one pixel relative to the first image after each comparison is performed can be plotted as a correlation function, as shown in FIG. 3.

In the particular example shown in FIG. 2, the displaced image 310 has been shifted 6 pixels or offset positions to the left relative to the reference image 300. Of course, it should be appreciated that the displaced image 310 is displaced both to the left and to the right relative to the reference image 300. It should also be appreciated that the displaced image 310 continues to be offset relative to the reference image 300 only so long as the displaced image 310 overlaps the reference image 300 sufficiently that a reasonable accurate correlation function value point is likely to be obtained. It should further be appreciated that, for those pixels that lie in regions of the reference and displaced images that do not overlap with a region of the other of the reference and displaced images, those pixels are compared to pixels having a default value, or are assigned a default comparison value, or the like.

It should be appreciated that, when the entire frame of the current reference image is compared to the entire frame of the current displaced image, cyclical boundary conditions are used. As indicated in Eqs. (2) and (3), the correlation value for each row is obtained and the row correlation values are summed. The sum is then averaged over the M rows to obtain an average, and noise-reduced, correlation function value point. This averaging is desirable to ensure that the correlation function value points will be stable to roughly the resolution to be obtained by interpolating to determine the correlation function extremum. Thus, to obtain roughly nanometer resolution by interpolating to determine the correlation function extremum when each correlation function value point is offset by approximately 1 $\mu$m from adjacent correlation function value points, it is assumed that the correlation function value points need to be stable roughly to the desired nanometer resolution value.

Figure 3:
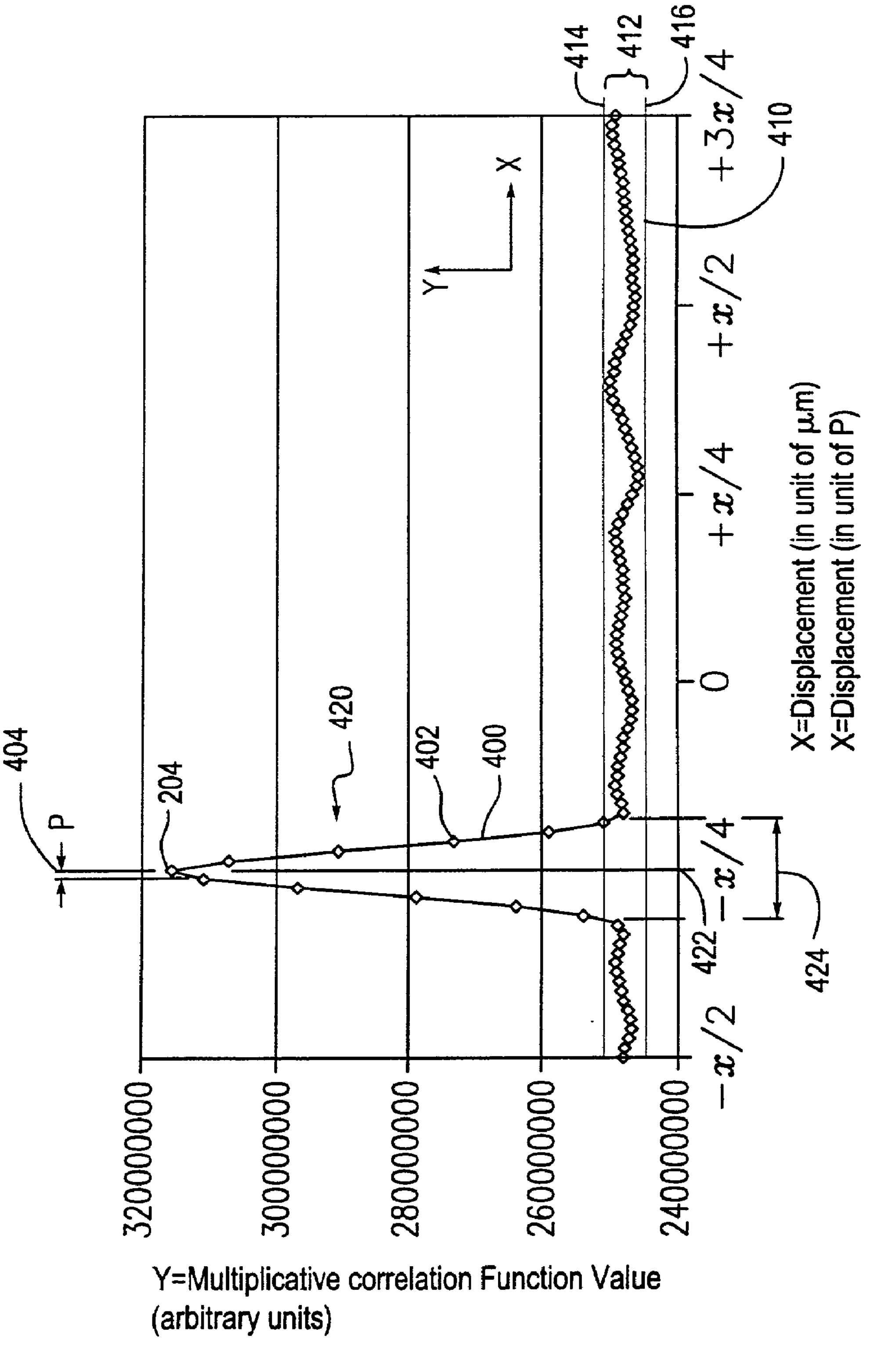
FIG. 3 is a graph illustrating the results of comparing the first and second images by using the conventional comparison technique and when using a conventional multiplicative correlation function, when the images are offset at successive pixel displacements.

FIG. 3 is a graph illustrating the results of comparing first and second images using the conventional technique shown in FIG. 2 according to the previously-described conventional multiplicative correlation function method. As shown in FIG. 3, the correlation function 400 is created by roughly connecting each of the correlation function value points for each offset position. In particular, the correlation function 400 includes a plurality of discrete correlation function value points 402 that are separated along the x-axis by a predetermined offset increment corresponding to the pixel pitch P, as indicated by the distance 404. The predetermined offset increment can be directly related to a displacement increment of the optically rough surface 104 shown in FIG. 1. This displacement increment depends upon the effective center-to-center spacing between the individual image elements 162 of the array 166 in the direction corresponding to the measurement axis 110, which is also referred to as the pixel pitch P, in the following description, and the amount of magnification of the displacement of the optically diffusing, or optically rough, surface 104 by the optical system of the readhead 126.

For example, if the effective center-to-center spacing of the image elements 162 in the direction corresponding to the measurement axis 110 is 10 $\mu$m, and the optical system of the readhead 126 magnifies the surface displacement by 10×, then a 1 $\mu$m displacement of the illuminated portion of the optically diffusing, or optically rough, surface 104 will be magnified into a 10 $\mu$m displacement of the speckle pattern on the image elements 162.

Each correlation function value point 402 is generated by digitally shifting the second image relative to the first image by the effective center-to-center spacing of the image elements 162 in the direction corresponding to the measurement axis 110. Because, in this case, the effective center-to-center spacing of the image elements 162 corresponds to about a 1 $\mu$m displacement of the optically diffusing, or optically rough, surface 104, the discrete correlation function value points 201 will be separated by a displacement distance of about 1 $\mu$m.

As shown in FIG. 3, the "landscape" of the correlation function 400 can be divided into two distinct portions, a regular background portion 410 wherein the correlation function is substantially flat or regular within a comparatively limited range and a peak portion 420 in which the peak or trough extremum lies and which is substantially steeply-sloped and/or exhibits correlation values substantially outside the limited range of the background portion. In particular, the regular background portion 400 has correlation function value points 402 having correlation function values that lie within the range of an extent 412 which is substantially smaller than the range of correlation function values included in the peak portion 420. It should be appreciated that, while the extent 412 is often narrow relative to the range of correlation function values of the correlation function in various exemplary embodiments described herein, the extent 412 need not have any particular relationship relative to the range of correlation function values of the correlation function, so long as the peak portion 420 can be reliably distinguished from the regular background portion 410. Thus, the correlation function deviations of the regular background portion 410 should be easily distinguishable from the correlation function peak, but may otherwise in fact be significantly uneven in various applications.

In particular, in the regular background portion 410, the correlation function value points 402 will have correlation function values that are no more than a maximum background value 414 and no less than a minimum background value 416. In contrast, for peak-type correlation function values, substantially all of the correlation function value points 402 that lie within the peak portion 420 have correlation function values that are significantly greater than the maximum background value 414. Similarly, for trough-type correlation function values, substantially all of the correlation function value points 402 that lie within the peak portion 420 have correlation function values that are significantly less than the minimum background value 416.

In general, the correlation function value points 402 lying within the correlation function peak portion 420 will usually be substantially equally distributed on either side of the actual correlation function peak 422 that represents the offset position where the two images most nearly align. Thus, the actual correlation function peak 422 lies generally at or near the center of a width 424 of the correlation function peak portion 420.

However, as outlined above, in this conventional technique, significant amounts of system resources must be provided to determine each pixel-to-pixel correlation value, to accumulate those correlation values for every pixel-to-pixel comparison for every pixel in the first image, to apply the appropriate scaling reference, and to perform this for every potential correlation function value point 402. This is especially true when the second image can move in at least two orthogonal directions relative to the first image. In this case, not only must a single full frame comparison be performed for every possible offset for each of the m columns that lie along the row dimension, but must also be performed, for each offset of the m columns, for each possible offset of the n rows that lie along the column dimension.

Thus, in this conventional technique, for a one-dimensional displacement, when the first image and the second image each comprises M×N pixels arranged in a two-dimensional array of M rows of pixels and N columns of pixels, one common correlation algorithm is:

$$R(p)=\left[\sum_{n=1}^{N}\left(\sum_{m=1}^{M}I_1(m,n)*I_2(p+m,n)\right)\right] \tag{2}$$

where:

R(p) is the correlation function value for the current offset value;

p is the current offset value, in pixels;

m is the current column;

n is the current row;

$I_1$ is the image value for the current pixel in the first image; and $I_2$ is the image value for the second image.

In this conventional technique, p can vary from −N to +N in one-pixel increments. Usually, however, the range of p is limited to −N/2 to N/2, −N/3 to N/3, or the like.

For a two-dimensional displacement, when the current reference image and the current displaced image each comprises M×N pixels arranged in a two-dimensional array of M rows of pixels and N columns of pixels, one common correlation algorithm is:

$$R(p,q)=\left[\sum_{n=1}^{N}\left(\sum_{m=1}^{M}I_1(m,n)*I_2(p+m,q+n)\right)\right] \tag{3}$$

where:

R(p,q) is the correlation function value for the current offset values in each of the two dimensions;

p is the current offset value, in pixels, along the first dimension;

q is the current offset value, in pixels, along the second dimension;

m is the current column;

n is the current row;

$I_1$ is the image value for the current pixel in the first image; and $I_2$ is the image value for the second image.

Similarly, in this conventional technique, q can vary from −M to +M in one-pixel increments. Usually, however, the range of q is limited to −M/2 to M/2, −M/3 to M/3, or the like.

As a result, this conventional technique would require determining the correlation value for up to 2M correlation function value points for a one-dimensional displacement and up to 2M×2N correlation function value points for a system that allows displacements in two dimensions. Thus, in one-dimensional displacements, and even more so in two-dimensional displacements, the conventional full frame analysis consumes too large an amount of system resources. As a result, the full frame correlation requires a system having either significant processing power, a high speed processor, or both. Otherwise, it becomes impossible to perform the full frame correlation function peak location process in real time.

However, as outlined in the incorporated 671 application, in general, only a few points near the extremum of the peak portion 420 of the correlation function 400 are used in determining the actual position offset, even when doing so to a very high accuracy by interpolation. Thus, some of the correlation function value points 402 that lie on the correlation function peak 420 are not used in determining the offset position, and none of the correlation function value points 402 that lie within the background portion 410 are so used.

The inventor has thus determined that it is generally only necessary to roughly determine the location of the correlation function peak 422 by locating a correlation function value point 402 that lies within the correlation function peak portion 420 before it becomes desirable determine the full correlation function value for each correlation function value point that is close to the peak 422 of the correlation function 400. The inventor has further determined that such a correlation function value point 402 that lies within the correlation function peak portion 420 can be identified by sparsely searching the correlation function 400 by determining the correlation function values for one or more correlation function value points 402 that are sparsely distributed in the correlation function 400.

As pointed out above, often only a few correlation function value points 402 around the peak 422 are used to determine the offset position of the true peak of the correlation function 400. The inventor has thus determined that it may be possible to use only some of those correlation function value points 402 of the sparse set that lie within the peak portion 420 of the correlation function 400 to determine the offset position of the peak 422. That is, the offset position of the peak 422 can be determined without having to determine the correlation function value for each correlation function value point 402 that is close to the peak 422 of the correlation function 400.

The inventor has also determined that, for the high-spatial-frequency images to which the sparse set of correlation function value points technique used in the systems and methods according to this invention are particularly effective, there will generally be some a priori knowledge about the average value of the extent 412 of the regular background portion 410 and the approximate values for the maximum background value 414 and the minimum background value 416.

For example, in the speckle-image-based optical position transducer 100 shown in FIG. 1, the optically rough surface 104 will produce such high-spatial-frequency images. When such high-spatial-frequency speckle images are used as the reference and displaced images discussed above, for any given optically rough surface 104, the maximum background value 414 and/or the minimum background value 416 of the background portion 412 are very stable and can be determined during manufacture of the speckle-image-based optical position transducer 100. As a result, depending on the type of correlation function used, the maximum background value 414 or the minimum background value 416 can be stored in the signal generating and processing circuitry 200 and used as a threshold value. In practice, in the speckle image-based position transducer 100, to eliminate the dependence of R(p,q) on laser intensity, R(p,q) is often normalized relative to the average value of the image intensity. Thus, in these situations, the value of the correlation function is actually the normalized value of the correlation function.

That is, the signal processing and generating circuit 200 has a priori knowledge about the correlation function background value 414 or 416 that the correlation function value points in the peak portion 420 must either exceed or lie below, respectively. As a result, a simple comparison to that a priori value can be used to quickly determine the general location of the peak portion 420 by finding any single correlation function value point having a correlation function value that either lies above the maximum background value 414 or that lies below the minimum background value 416.

The inventor has further discovered that the width 424 of the peak portion 420 for such high-spatial-frequency images is generally narrow relative to the full extent of the correlation function domain. The inventor has further discovered that the correlation function values for correlation function value points 402 at the edge of the peak portion 420 sharply depart from the average correlation function value of the correlation function value points 402 that lie within the regular background portion 410. That is, in general, until immediately around the actual correlation function peak 422, such high-spatial-frequency images are no more correlated at positions near the peak portion 420 than at positions that are far from the peak portion 420. In contrast, non-high-spatial-frequency images, such as those used in the sparse techniques disclosed in Musmann, have very broad and shallow correlation function value peaks. That is, the techniques disclosed in Musmann operate only because the correlation function at all points has a gradient that points toward the location of the correlation function peak.

In certain situations, there may not be any a priori knowledge available about particular images to be used as the reference and displaced images 300 and 310. However, the inventor has further determined that, even if such a priori knowledge is not available, such a priori knowledge can be readily be derived any time the correlation function 400 is determined. That is, in general, for most high-spatial-frequency images, the average value of the background portion 410, and the extent 412, the maximum background value 414 and the minimum background value 416 of the regular background portion 410 are substantially stable, especially in comparison to the correlation function values that will be obtained for correlation function value points 402 that lie within the peak portion 420.

Thus, these values can be derived from a fully defined correlation function obtained by conventionally comparing a displaced image to a reference image. These values can also be derived by comparing a given image to itself, i.e., auto-correlating that image. Additionally, for the same reasons as outlined above, it should be appreciated that the width of the peak portion of the auto-correlation function, which is by definition at the zero-offset position, can be determined by determining the correlation function values for at least a subset of the correlation function value points near the zero-offset position, without having to determine the correlation function values for correlation function value points distant from the zero-offset position. Similarly, for the same reasons as outlined above with respect to FIG. 8, it should be appreciated that less than all of the pixels of the image can be used in generating the correlation function values for the auto-correlation function.

Figure 5:
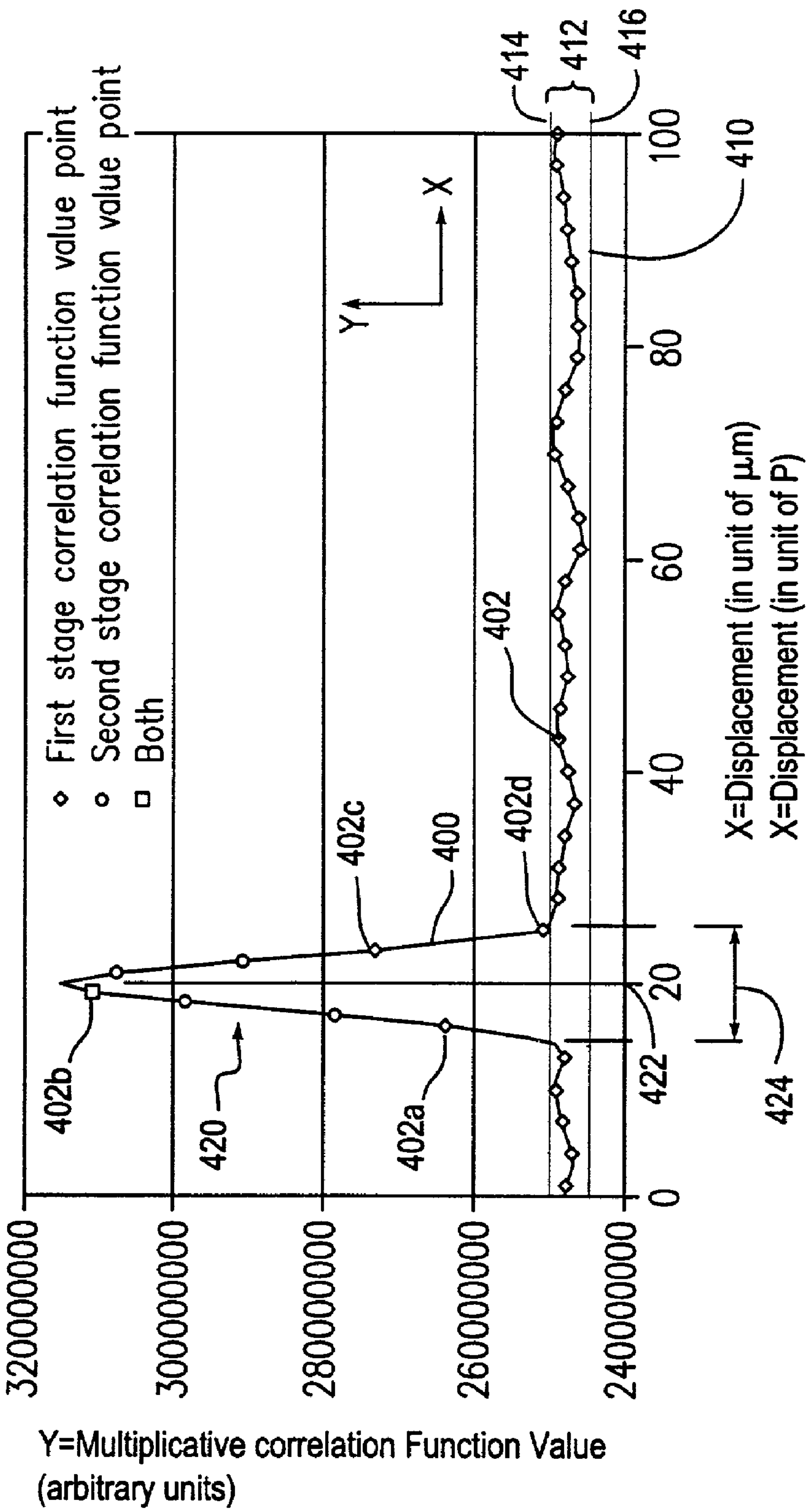
FIG. 5 is a graph illustrating the results of comparing the first and second images using a first exemplary embodiment of the sparse set of image correlation function value points comparison technique of FIG. 4 and using a conventional multiplicative correlation function.

In a first exemplary technique according to this invention, as shown in FIGS. 4 and 5, in place of the conventional image correlation function peak location process outlined with respect to FIGS. 2 and 3, locating the peak of the image correlation function is performed as a two (or more) step process. In particular, as shown in FIG. 4, rather than comparing the displaced image 310 to the reference image 300 for every column 330, the displaced image 310 is compared to the reference image 300 only at selected columns 332 that are displaced from each other.

For example, in the exemplary embodiment shown in FIG. 4, the displaced image 310 is currently being compared to the reference image 300 at an offset position that corresponds to the column 332-2. In a previous comparison, the displaced image 310 was compared to the reference image 300 at an offset position that corresponded to the column 332-1 that is spaced apart from the current column 332-2 by one or more skipped columns 332. Likewise, a next comparison of the displaced image 310 to the reference image 300 will take place at a column 332-3 that is spaced apart from the current column 332-2 by one or more skipped columns 332.

That is, in a first step, for a number of sparsely-located offset positions, all of the rows of the displaced image are compared in full to the corresponding rows of the reference image to a generate correlation value. Thus, a sparse series of such correlation values, i.e., the sparse set of the correlation function value points 402, corresponding to those shown in FIG. 5, is generated by shifting the displaced image 310 relative to the reference image 300, after each comparison is performed, by either a predetermined number of pixels or by a dynamically-determined number of pixels, or to a next location in a sequence of predetermined offset locations or to a next dynamically determined offset location.

Next, in a first exemplary embodiment of the sparse searching technique according to this invention, the sparse set of the correlation function value points 402 determined in the first stage are analyzed to identify those correlation function value points 402 of the sparse set that lie outside of the extent 412 of the correlation function values of the background portion 410, i.e., to identify those correlation function value points 402 of the sparse set that lie within the peak portion 420 of the correlation function 400. As outlined above, in the high-spatial-frequency images used with the systems and methods of this invention, such as those of the optically rough surface 104, the correlation function value points 402 in the regular background portion 410 of the correlation function, i.e., those points 402 that do not lie in the peak portion 420, have values that range only slightly away from an average value of the regular background portion 410. That is, the values of the correlation function value points in the regular background portion 410 will not be greater than the maximum background value 414 or will not be less than the minimum background value 416.

Thus, by comparing the image value of each correlation function value point 402 in the set of sparsely located correlation function value points shown in FIG. 5 with either the minimum background value 416 or the maximum background value 414, the correlation function value points 402 of the sparse set can readily be classified as part of the background portion 410 or as part of the peak portion 420. As a result of identifying one or more of the correlation function value points 402 of the sparse set of correlation function value points 402 that lie within the peak portion 420, the peak portion 420, and thus the correlation function peak or trough, can be approximately located.

Alternatively, in a second exemplary embodiment of the sparse searching technique according to this invention, the sparse set of the correlation function value points 402 determined in the first stage are analyzed to identify those pairs of adjacent ones of the correlation function value points 402 of the sparse set that have a slope that is greater than a threshold slope. That is, as shown in FIGS. 3, 5 and 7–10, the absolute values of the slopes of the correlation function defined between adjacent correlation function value points 402 that lie within the background portion 410 are significantly less than the absolute values of the slopes between most pairs of adjacent correlation function value points that have at least one of the pair lying within the peak portion 420.

Thus, a maximum absolute value of the slope between any set of two correlation function value points that both lie within the background portion can be determined as the threshold slope. Then, for any pair of adjacent correlation function value points of the sparse set, a sparse slope of the correlation function between those two sparse correlation function value points can be determined. The absolute value of that slope can then be compared to the threshold slope. If the absolute value of the sparse slope is greater than the threshold slope, at least one of the pair of adjacent correlation function value points lies within the peak portion 420.

Alternatively, a maximum positive-valued slope and a maximum negative-valued slope can similarly be determined as a pair of threshold slopes. Then, the value of the sparse slope can be compared to the pair of threshold slopes. Then, if the sparse slope is more positive than the positive-valued slope, or more negative than the negative-valued slope, at least one of the pair of adjacent correlation function value points lies within the peak portion 420.

Of course, it should be appreciated that the absolute value of the slope for a pair of adjacent correlation function value points can be less than or equal to the absolute value, or the slope can be between the maximum positive-valued and negative-valued slopes, while both of the pair of correlation function value points lie within the peak portion 420. To prevent this from adversely affecting the sparse search techniques discussed above, some or all of the pairs of adjacent ones of the sparse set of correlation function value points are analyzed in various exemplary embodiments. It should further be appreciated that the threshold slope or slopes, like the average, minimum and/or maximum values of the background portion 410 can be predetermined or determined from an auto-correlation function or from a correlation function for a set of representative images.

Then, in the second step, based on the approximately determined location of the peak portion 420, the first and second images will be compared at surrounding locations in the correlation space, i.e., at offset positions that will lie within the peak portion 420, to generate the correlation values for all of, or at least a sufficient number of, the correlation function value points 402 that lie within the approximately determined peak portion 420. In particular, the second step will often unequivocally determine the pixel displacement that corresponds to the peak correlation value, because the sparse search has missed it only by one or a few pixels. It should be appreciated that, as discussed in the incorporated 761 application, only the correlation values that are around the actual correlation peak 422 are used to determine the interpolated sub-pixel displacement. Thus, only around the approximately-determined correlation peak or trough 422 do an additional number of the correlation function value points 402 need to be determined.

In the particular exemplary embodiment shown in FIGS. 4 and 5, in comparison to the exemplary embodiment shown in FIGS. 2 and 3, only every third offset position is used to determine a correlation function value point 402. As shown in FIG. 5, as a result, only four correlation function value points 402*a*–402*d* of the sparse set of correlation function value points 402 lie within the width 424 of the correlation function peak portion 420. However, only M/3 (or fewer) correlation function value points 402 were determined to locate the peak portion 420, compared to M such points in the conventional technique shown in FIGS. 2 and 3. Of course, an even more sparsely distributed set of offset positions could be used.

In particular, a correlation function value point 402*b* has a correlation function value that is farthest from the average value of the background portion 410. This correlation function value point 402*b* is bracketed by a pair of correlation function value points 402*a* and 402*c* that also lie in the correlation function peak portion 420 but which have correlation function values that are closer to the average value of the background portion 410. Accordingly, the actual correlation function peak 422 must lie somewhere between the first and third correlation function value points 402*a* and 402*c*.

Thus, it is only necessary to determine a correlation function value point for those additional higher-resolution offset positions that lie between the offset positions corresponding to the first and third correlation function value points 402*a* and 402*c*. Moreover, depending on the particular technique used to interpolate between the full set of correlation function value points 402, or to fit a curve to the full set of correlation function value points 402, it may be necessary only to determine those correlation function value points for offsets that are close to the correlation function value point 402*b*, such as, for example, within two or three of the higher resolution offset steps from the correlation function value point 402*b*.

In the exemplary embodiment shown in FIG. 5, as outlined above, the sparse set of correlation function value points is created by determining a correlation function value for every third offset position. That is, in the exemplary embodiment shown in FIG. 5, the sparse set of correlation function value points has been generated by skipping a predetermined number of offset positions or pixels.

In general, as outlined above, for the high-spatial-frequency images to which the systems and methods of this invention are particularly applicable, the average value of the background portion 410, the maximum and minimum values 414 and 416 of the background portion 410 and/or the width 424 and the approximate height of the peak portion 420 can be known a priori for systems that image a known object. Such situations include imaging the optically rough surface 104 in the speckle-image-based optical position transducer system 100 shown in FIG. 1.

In these situations, because the width 424 of the peak portion 420 is known, the predetermined number of, i.e., the spacing of, the correlation function value points 402 to be included in the sparse set of the correlation function value points 402 can be selected such that at least one of the sparse set of correlation function value points 402 is guaranteed to fall within the width 424 of the peak portion 420 regardless of its position in any particular correlation function 400. However, it should be appreciated that it may be more desirable to have the sparse set of correlation function value points include sufficient numbers of correlation function value points 402 (and thus have a smaller spacing) such that a desired number, such as two or more, of the correlation function value points 402 of the sparse set are guaranteed to fall within the width 424 of the peak portion 420.

However, as outlined above, the sparse set of correlation function value points 402 can be created in alternative exemplary embodiments by dynamically determining the number of correlation function value points 402 (and thus the spacing between pairs of adjacent ones of the correlation function value points 402) to be included in the sparse set, and using that number to govern a predetermined sequence of correlation function value points 402 to be determined in sequence order, or by dynamically determining the sequence of correlation function value points 402 to be determined in sequence order. It should also be appreciated that, when dynamically determining the number of correlation function value points 402 to be included in the sparse set (which implicitly determines the spacing and vice versa), the sparse set can be dynamically determined for each correlation event, such as in dynamically determining the sparse set view of the previous offset determined in a previous correlation event, or can be dynamically determined based on changes to the base image used in the correlation process. The sparse set of points can be dynamically determined during a set-up or calibration mode prior to normal operation, or in near real-time or real-time during normal operation in various embodiments.

Moreover, since any correlation function value point having a correlation function value that lies outside the extent 412 of the background portion 410 will identify the location of the correlation function peak portion 420, in various exemplary embodiments, determining the correlation function values for correlation function value points that are spaced by more than the peak width 424 from a first determined one of the sparse set of correlation function value points that lies within the peak portion 420 can be omitted. As a result, it becomes possible to further reduce the sparse set of correlation function value points 402 by skipping those correlation function value points 402 of the sparse set of correlation function value points 402 that have not been analyzed once the width of the correlation function peak portion 420 has been traversed.

That is, once a correlation function value point having a correlation function value that is greater than the maximum background value 414 for a positive-going extremum or less than the minimum background value 416 for a negative-going extremum of the background portion 410 is identified, the approximate location of the peak portion 420 has been located. Furthermore, as outlined above, the width 424 of the peak portion 420 is, in many applications, very narrow relative to the range of the correlation function 400. As a result, as outlined above, once the approximate location of the peak portion 420 has been identified, determining the correlation function value for any correlation function value points 402 that are more than the width 424 of the peak portion 420 away from that correlation function value point 402 in the peak portion 420 is essentially useless.

In yet another variation of the first exemplary embodiment outlined above with respect to FIGS. 4 and 5, a "binary" sequencing of the correlation function value points included in the sparse set of correlation function value points to be determined that takes advantage of this result can be used. This is one type of predetermined sequence for the sparse set of the correlation function value points 402. The correlation function space can be searched using a binary search technique by initially determining the correlation function value for correlation function value points 402 at each extreme offset position and for an offset position that lies approximately halfway between the extreme offset positions. If none of these correlation function value points 402 lie within the peak portion 420, then additional correlation function value points 402 that lie approximately halfway between each pair of adjacent previously-determined correlation function value points can be determined. This can then be repeated until a correlation function value point lying in the peak portion 420 is identified. Importantly, this iterative process does not need to continue after at least one such correlation function value point 402 is identified.

Thus, for the first iteration, for a correlation function 400 that has a first extreme offset position at a position $-L$ and a second extreme position at an offset position of $+L$, where L is generally related to the image frame dimension, the correlation function values are determined for correlation function value points 402 having offset values of $-L$, $+L$ and 0. Then, in a second iteration, the correlation function values for correlation function value points having offset values of $-L/2$ and $+L/2$ are determined. Then, in a third iteration, the correlation function values for correlation function value points 402 having offset values of $-3L/4$, $-L/4$, $+L/4$ and $+3L/4$ are determined. This continues until the correlation function values for the entire sparse set of correlation function value points 402 are determined or, more likely, the location of the peak portion 420 is identified. Of course, it should be appreciated that, during any particular iteration, if one of the correlation function value points 402 to be determined in that iteration lies within the peak portion 420, any other correlation function value points 402 of that iteration that are more than the width 424 of the peak portion 420 away from that correlation function value point 402 do not need to have their correlation function values determined.

In this particular variation, once the approximate location of the peak portion 420 is identified using this binary search, the second stage is performed, where the correlation function values for each of the correlation function value points 402 that may lie in the peak portion 420 are determined. Alternatively, in a variation of the second step, because only a single correlation function value point lying within the peak portion is normally identified using this binary search technique, in a second stage of this variation, a regularly spaced sparse set of correlation function value points distributed around that correlation function value point 402 that lies within the peak portion 420 can be determined to more precisely locate the peak portion 420.

Then, in a third stage, as outlined above with respect to the second stage discussed in the previously-described first exemplary embodiment, the furthest correlation function value point 402*b* and the adjacent correlation function value points 402*a* and 402*c* within the peak portion 420 can be identified from this sparse set of correlation function value points determined in the second step. Then, at least some of the correlation function value points lying adjacent to the farthest correlation function value point 402*b* and between the correlation function value points 402*a* and 402*c* can be determined to provide the correlation function value points 402 necessary to perform the particular interpolation technique used.

In yet another exemplary variation of the sparse set technique outlined above with respect to FIGS. 4 and 5, rather than using a single sparse set, in a first stage, a first extremely sparse set of correlation function value points that may have a spacing, for example, greater than the width 424 of the peak portion 420 can be used. Then, if none of the correlation function value points of this extremely sparse set lie within the peak portion 420, in a second stage, the extremely spares set can be offset by a determined amount ,or a second, less extremely sparse set of correlation function value points 402 can be used. Then, if the peak portion 420 is not located, subsequent iterations using third, fourth, etc., continually less offset, or less sparse, sets can be determined until the peak portion 420 is located.

Once the peak portion 420 is located, any subsequent less sparse sets can be omitted, as can be the rest of the correlation function value points of the current sparse set. Then, a final stage corresponding to the second stage outlined above with respect to the first exemplary embodiment described relative to FIGS. 4 and 5 can be performed to provide the correlation function value points 402 usable to determine the actual location of the correlation function peak 402. In particular, it should be appreciated that this variation is essentially similar to the binary search variation, except that the location of the correlation function value points 402 in each sparse set is not precisely dictated relative to the extreme offset positions as in the binary search variation.

Figure 7:
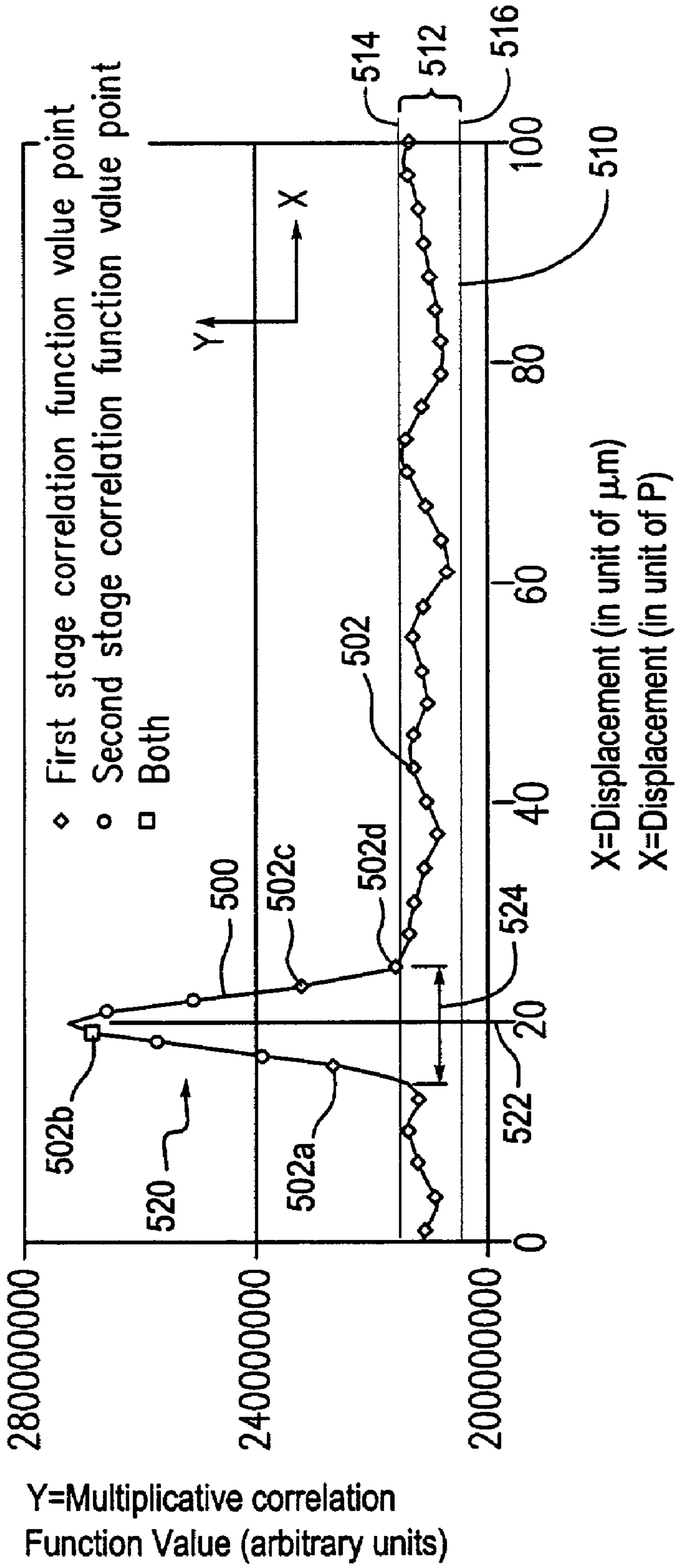
FIG. 7 is a graph illustrating the results of comparing the first and second images using the second exemplary embodiment of the sparse set of image correlation function value points comparison technique of FIG. 6 and using a conventional multiplicative correction function.

FIGS. 6 and 7 illustrate a second exemplary embodiment of the sparse set of image correlation function value points comparison technique according to this invention. In particular, with respect to the second exemplary embodiment illustrated in FIGS. 6 and 7, the inventor has determined that, for the high-spatial-frequency images to which the systems and methods of this invention are particularly suited, it is possible to use less than all of the pixels when determining the correlation function value for any particular correlation function value point 402 without effectively altering the functional relationships between the normalized background portion 410 and the normalized peak portion 420 of the correlation function 400.

That is, like the correlation function 400 shown in FIG. 4, the correlation function 500 shown in FIG. 7 has a regular background portion 500 having correlation function value points 502, including points 502*a*–502*d*, having correlation function values that lie within a range of an extent 512 which is substantially smaller that the range of correlation function values included in the peak portion 520. The extent 512 is defined by a maximum background value 514 and a minimum background value 516. Similarly, the correlation function 500 has a peak portion 520 that has a generally narrow width 524 relative to the domain of the correlation function 500. In fact, except for the range of correlation function values over which the correlation function 500 extends, the general shape of the correlation function 500 is more or less indistinguishable from the shape of the correlation function 400. Thus, in some exemplary embodiment of this second exemplary embodiment, as shown in FIG. 6, rather than comparing every pixel of every row M in the displaced image 310 to the corresponding row and pixel in the reference image 300 to determine the correlation function value point 402, only a few rows M, and, at an extreme, only one row M, will be compared to determine the correlation function value for a particular function value point 502.

Figure 8:
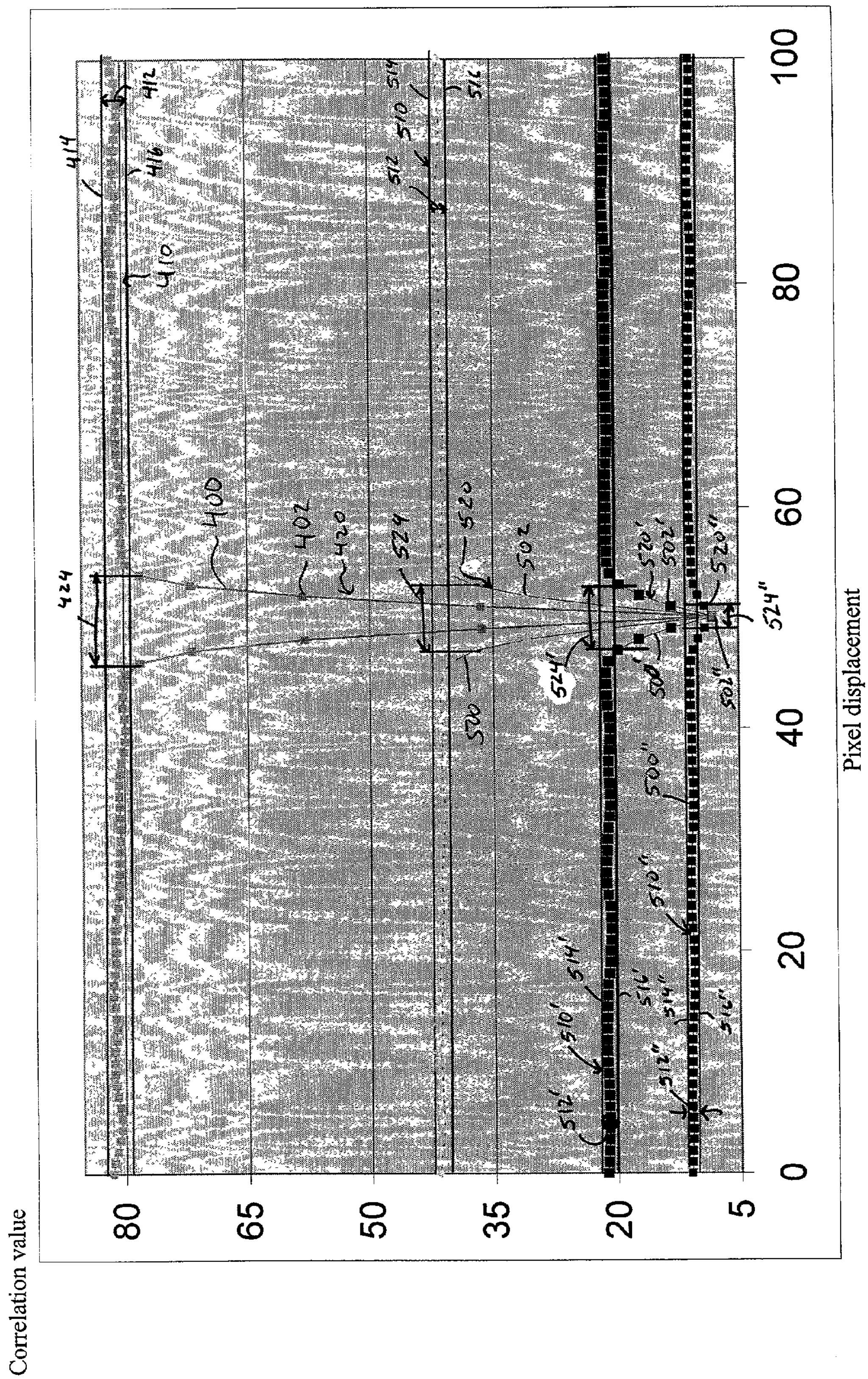
FIG. 8 is a graph illustrating the relative shapes of the correlation function for different numbers of pixels used in the correlation function.

FIG. 8 illustrates various different correlation functions 400, 500, 500' and 500" obtained by using different amounts of the pixels of the reference and displaced images 300 and 310 when determining the correlation function values for the correlation function value points 402 and 502. It should be appreciated that the correlation functions 400, 500, 500' and 500" shown in FIG. 8 are average difference correlation functions, in contrast to the multiplicative correlation functions shown in FIGS. 3, 5 and 7. In particular, as shown in FIG. 8, as the number of rows of pixels that are used to determine the correlation function values gets progressively smaller for the correlation functions 500, 500' and 500", both the average value of the background portions 510 and the difference between the values in the background portions 510 and the extreme value of the correlation function value points 502 lying in the peak portions 520 gets smaller.

At the same time, the noise in the background portions 510, i.e., the extents 512 between the corresponding maximum background values 514 and minimum background values 516, increases. In this exemplary embodiment, the signal is the difference of the extreme value of the correlation function value points lying in the peak portions 520 from the average value of the corresponding background portions 510. It should be appreciated that, because both the noise increases as the number of rows decreases and the difference between the extreme value of the peak portions 520 and the average value of the corresponding background portions 510 decreases, the signal to noise ratio decreases even more rapidly.

However, as shown in FIG. 8, the relative widths 524 of the peak portions 520 in terms of the pixel spacing does not substantially change. In fact, in general, the width 524 of the peak portion 520, i.e., the offset difference between the correlation function value points that are closest to but outside of the extent 512, will generally shrink, rather than increase, because of the greater noise. That is, i.e., extents 512 which are larger due to additional noise of the background portions 510, will encompass some correlation function value points 502 that would have been determined to be part of the peak portion 420 in the less noisy first exemplary embodiment.

It should also be appreciated that any of the various techniques outlined above for determining the number of correlation function value points 402 to be included in the sparse set of correlation function value points 402 can be combined with the technique for limiting the number of image pixels to be compared for a correlation function value of this second exemplary embodiment. Thus, it becomes possible to reduce even further the amount of system resources and processor time and power necessary to determine each correlation function value for each correlation function value point 502 included in the sparse set of correlation function value points 502.

For example, in various exemplary embodiments, because only a small number of rows is compared, each comparison can be quickly generated. However, because only a small number of rows, rather than the entire image, is used, the correlation value obtained for each correlation function point only approximates the correlation value that would be obtained from comparing all of the rows of the second image to the corresponding rows of the first image for each such correlation point. Nonetheless, the approximate correlation values will still be able to indicate the approximate location of the peak portion 520. Because fewer, and in some circumstances, significantly fewer, pixels are used in determining the correlation function value for the correlation function value points 502 in the sparse set of correlation function value points 502, the amount of system resources consumed in locating the approximate position of the peak portion 520 is reduced, sometimes significantly.

Figure 9:
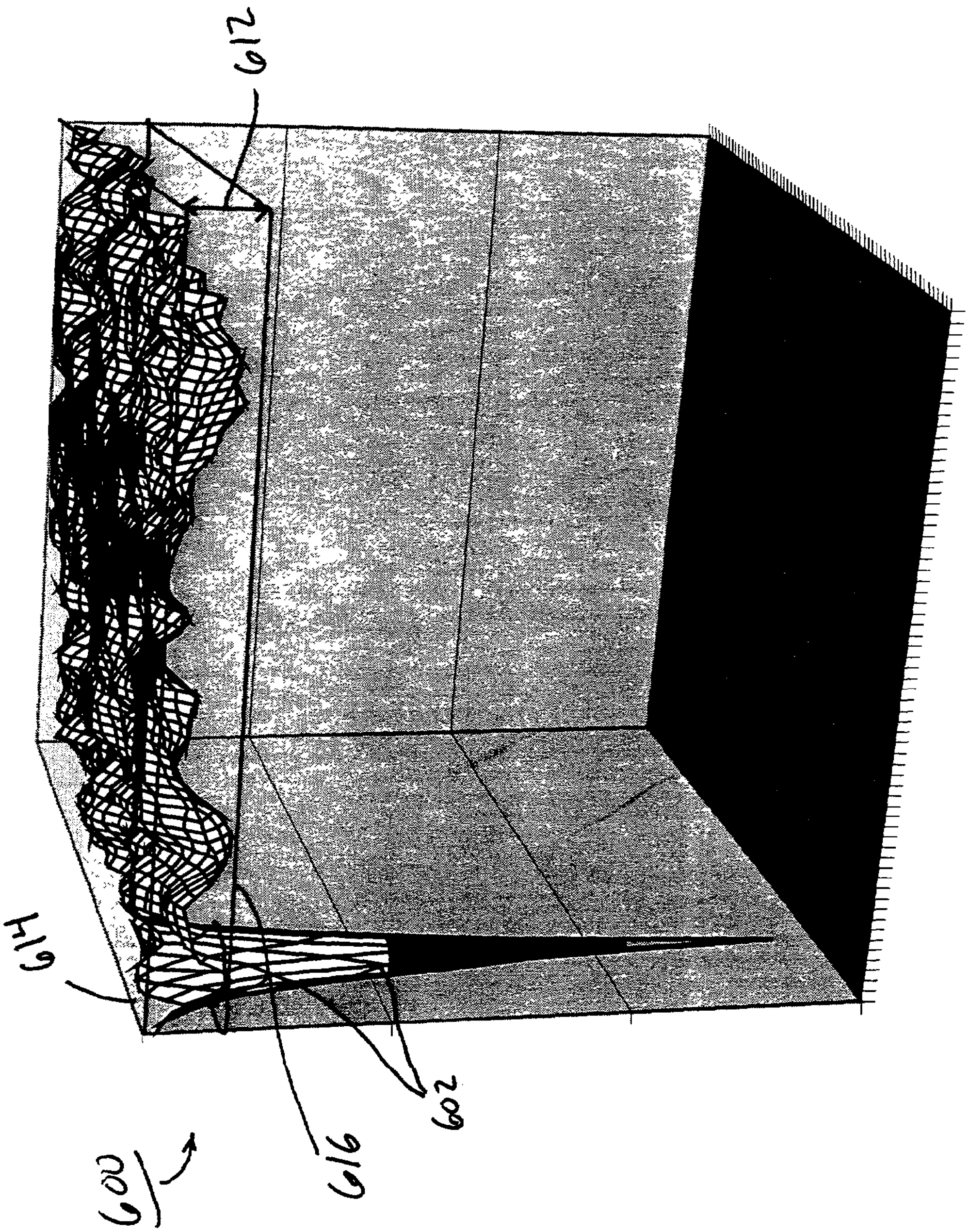
FIG. 9 is a graph illustrating the results of comparing the first and second images using the conventional comparison technique and when using the conventional difference correlation function, when the images are offset in two dimensions at successive pixel displacements.

FIG. 9 is a graph of a conventional correlation function 600 obtained by correlating the displaced and reference images 310 and 300, where the displaced image 310 can be displaced in two dimensions relative to the reference image 300. In particular, as shown in FIG. 9, the correlation function 600 extends in two dimensions, in contrast to the one-dimensional correlation functions show in FIGS. 3, 5 and 7. In particular, for the conventional two-dimensional correlation function 600 shown in FIG. 9, a very dense set of correlation function points 602 is determined for the conventional two-dimensional correlation function 600. Accordingly, while the location of the peak portion 620 of the two-dimensional correlation function 600, and the location of the correlation function peak (in this case, trough) 622 can be very accurately determined, the system resources consumed in determining this very dense set of correlation function value points 602 makes it difficult, if not impossible, to determine the correlation function 600 in real time even if high speed data processors are used.

Figure 10:
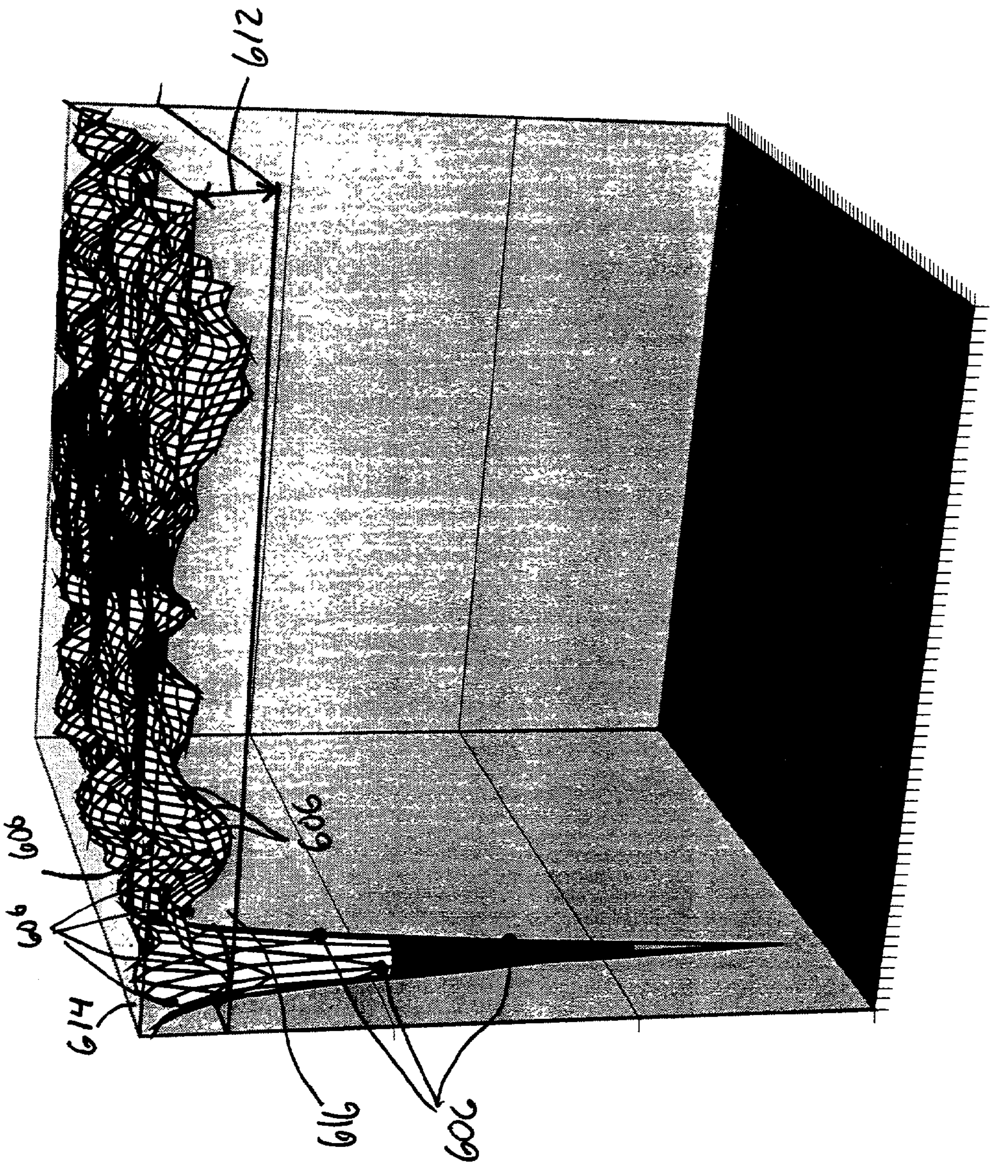
FIG. 10 is a graph illustrating the results of comparing the first and second images using the first exemplary embodiment of the sparse set of image correlation function value points comparison technique according to this invention and using a conventional difference correlation function, when the images are offset in two dimensions at successive pixel displacements.

Accordingly, as shown in FIG. 10, if a sparse set of correlation function value points 606, selected from the set of all correlation function value points 602 of the correlation function 600, is used according to the first exemplary embodiment outlined above with respect to the one-dimensional correlation functions 400 and 500, the amount of systems resources consumed in determining this two-dimensional sparse set of correlation function value points 606 is considerably reduced. As shown in FIG. 10, in one exemplary embodiment, the sparse set of correlation function value points 606 can be regularly distributed, for example, as a grid, across the two-dimensional correlation function 600 to ensure that at least one of the sparse set 606 of the correlation function value points 602 lies within the narrow peak portion 620. It should be appreciated that only a portion of the grid of sparsely distributed correlation function value points 606 are labeled in FIG. 10. However, it should be appreciated that the sparse set of correlation function value points 606 can be distributed in any desired manner within the two-dimensional correlation function 600.

In particular, the sparse set of correlation function value points 606 can be decomposed into various subsets of correlation function value points 602 that are searched in order as outlined above with respect to the multilevel search variation discussed with respect to the first exemplary embodiment. Similarly, in another exemplary variation, a two-dimensional binary search technique, similar to the one-dimensional binary search technique discussed above, could be used.

Finally, it should be appreciated that, as in the second exemplary embodiment outlined above, only a subset of the pixels of the reference and displaced images can be compared, rather than comparing all of the pixels of the reference and displaced images. As outlined above with respect to the second exemplary embodiment, this would allow a further significant reduction in the amount of systems resources needed to determine each correlation function value.

As outlined above, after determining and analyzing the correlation function values for each of the first or multiple stages of the sparse sets of correlation function value points 606, once the peak portion 620 of the two-dimensional correlation function 600 is located, one or more stages of less sparse sets of correlation function value points can be determined, culminating in a full set of correlation function value points to be used in determining the location of the correlation function peak using the techniques outlined in the '671 application. Of course, it should be appreciated that, once the location of the peak portion of the two-dimensional correlation function is located, the full set of correlation function value points can be used as the only stage in determining the position of the actual correlation function value peak using the techniques outlined in the '671 application.

It should particularly be appreciated that, since the sparse set of correlation function value points 606 used to identify the location of the peak portion 620 of the two-dimensional correlation function 600 is sparse in two dimensions, the ratio of the correlation function value points 606 included in the sparse set, relative to the number of the correlation function value points 602 in the entire correlation function 600, is extremely small. Thus, a significant reduction in the system resources necessary to search through the two-dimensional correlation function 600 can be obtained, even relative to the reduction in system resources necessary to determine the correlation functions for the sparse set of correlation functions 402 for the one-dimensional correlation functions shown in FIGS. 5 and 7.

It should be appreciated that, for a two-dimensional correlation function, the points 606 within the peak portion 620, which correspond to the first and third correlation function value points 402*a* and 402*c* discussed above, may not lie on opposite sides of a furthest correlation function value point 606 within the peak portion 620. Thus, for a two-dimensional correlation function, those first and third correlation function value points 606 can be used to define a range of offset positions extending in all directions from the furthest correlation function value point 606 in the two-dimensional correlation function. Similarly, this same technique could be used to determine a range around a correlation function value point 402*b* in a one-dimensional offset situation. Then, at least some of the correlation function value points 606 (or 402) within that range are used to determine the offset position of the correlation function peak.

Figure 11:
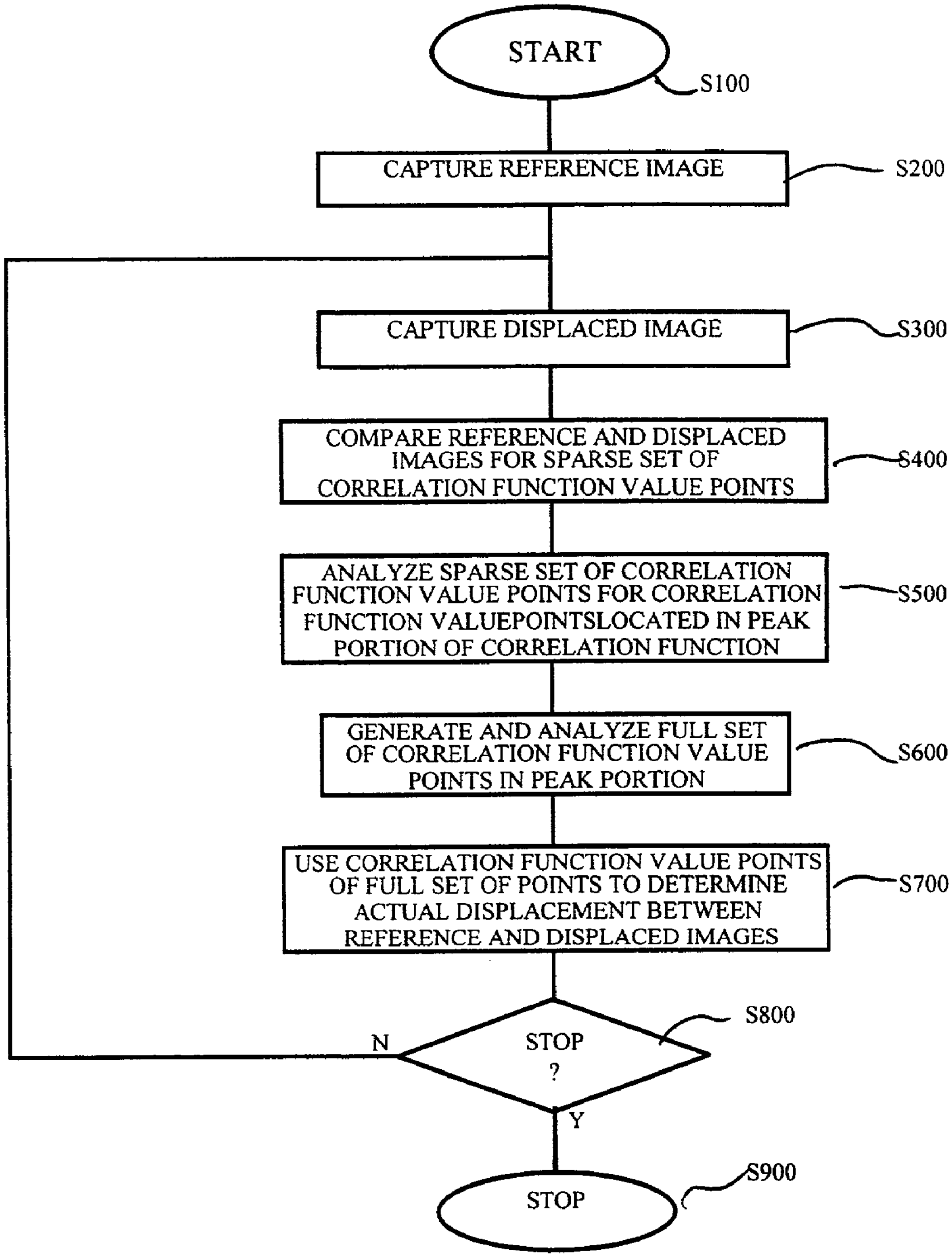
FIG. 11 is a flowchart outlining a first exemplary embodiment of a method for using a sparse set of image correlation function value points locations in the correlation function space to locate a peak or trough to a first resolution according to this invention.

FIG. 11 shows a flowchart outlining a first exemplary embodiment of a method for using a sparse set of image correlation function value points locations in the correlation function space to locate a peak or trough to a first resolution according to this invention. As shown in FIG. 11, operation begins in step S100 and continues to step S200, where the reference image is captured. Then, in step S300, the displaced image is captured. It should be appreciated that the displaced image is displaced by some unknown offset relative to the reference image, but overlaps the reference image. Operation then continues to step S400.

In step S400, the reference and displaced images are compared for a plurality of sparsely distributed offset positions, i.e., offset positions that correspond to a sparse set of correlation function value points according to any of the sparse set constructions or procedures previously discussed. For example, in this first exemplary embodiment, in step S400, the sparse set of correlation function value points is either predetermined, or corresponds to a predetermined sequence of correlation function value points to be determined. Operation then continues to step S500.

In step S500, the correlation function value points of the sparse set of correlation function value points are analyzed to identify one or more of the correlation function value points of the sparse set that lie within a peak portion of the correlation function. As outlined above, the correlation function value points of the sparse set that lie within the peak portion can be determined by comparing the correlation function values of the correlation function value points of the sparse set with a previously-determined characteristic of the extent of the regular background portion, such as an average value, a previously-determined maximum value, or a previously-determined minimum value. Whether the minimum or maximum value is used will depend on the type of mathematical function used to obtain the correlation function values.

Then, once the peak portion is determined in step S500, in step S600, a higher-resolution set, such as a full set, of correlation function value points for at least a portion of the offset positions that lie within the approximately determined peak portion are determined. That is, as outlined above, the full portion corresponds to a number of adjacent offset positions spaced apart at the pixel pitch. However, it should be appreciated that not all of the offset positions that lie within the peak portion need to be determined. Next, in step S700, the correlation function values for at least some of the full set of correlation function value points determined in step S600 are used to determine the actual displacement or offset between the reference and displaced images. It should be appreciated that any of the various techniques set forth in the incorporated 671 application can be used in step S700. Operation then continues to step S800.

In step S800, a determination is made whether operation of the method is to stop, or whether additional displacements will need to be determined. If additional displacements will need to be determined, operation jumps back to step S300 to capture a subsequent displaced image. Otherwise, operation continues to step S900, where operation of the method halts.

It should be appreciated that, for position transducers, such as the speckle-image-based optical transducer 100 shown in FIG. 1, in many applications the displaced image captured in step S300 will eventually be displaced beyond the frame of the reference image S200. In this case, the various techniques disclosed in U.S. patent application Ser. No. 09/860,636, incorporated herein by reference in its entirety, can be used between steps S800 and S300 to provide for new reference images. In particular, a previously-obtained displaced image could be used as the next reference image.

Figure 12:
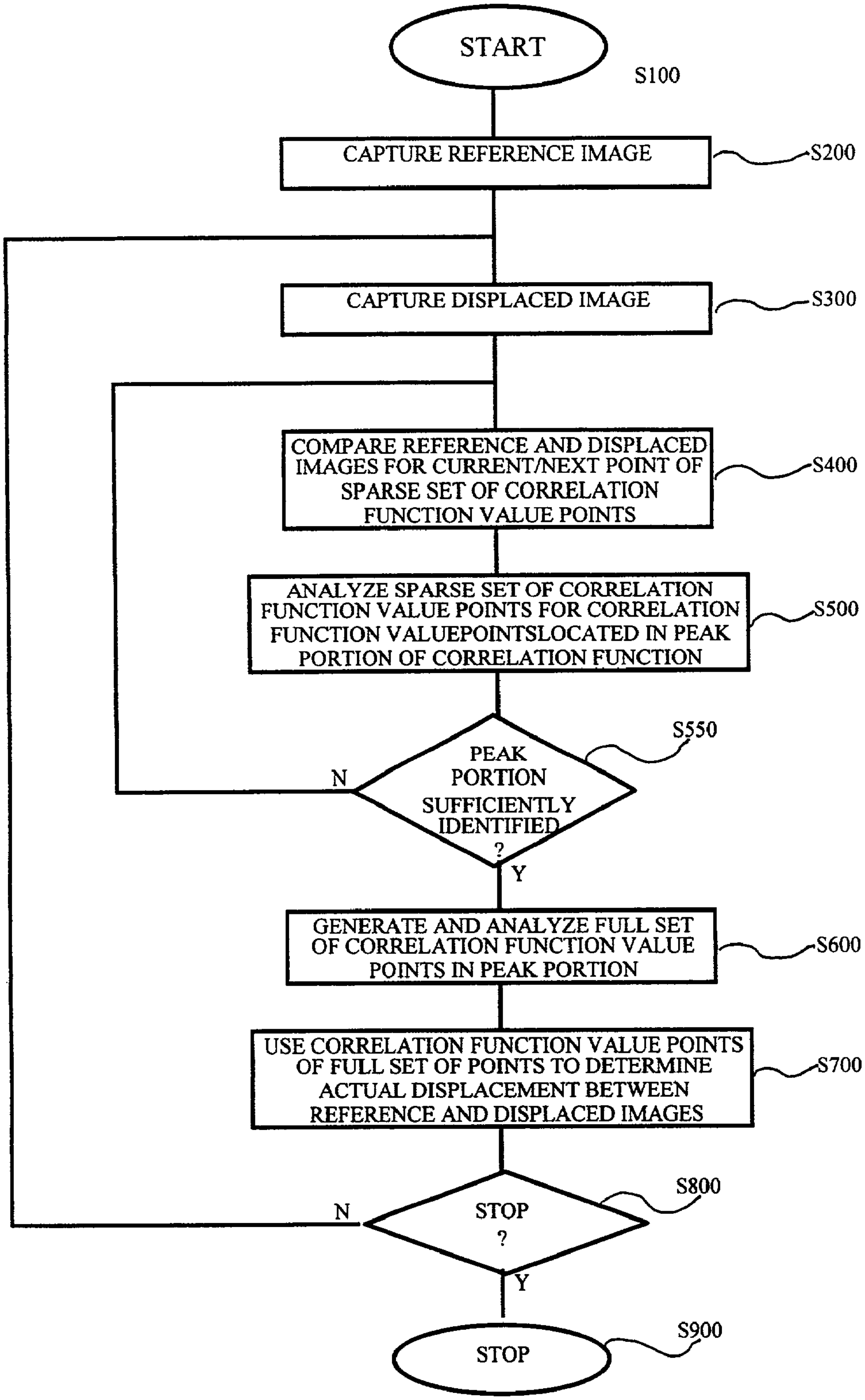
FIG. 12 is a flowchart outlining a second exemplary embodiment of the method for using a sparse set of image correlation function value points locations in the correlation function space to locate a peak or trough to a first resolution according to this invention.

FIG. 12 shows a flowchart outlining a second exemplary embodiment of the method for using a sparse set of image correlation function value points locations in the correlation function space to locate a peak or trough to a first resolution according to this invention. The steps S100–S300 of FIG. 12 and FIG. 11 are similar. Regarding the steps S400 and S500, however, in the exemplary embodiments outlined in FIG. 11, the correlation function values for all of the correlation function value points of the sparse set are determined in step S400. Then, all of the determined sparse correlation function values are analyzed in step S500. In contrast, as shown in FIG. 12, the steps S400 and S500 are modified such that the correlation function value for one sparse correlation function value point can be determined in S400 and analyzed in step S500, before the correlation function value for a next sparse correlation function value point is determined in step S400. In this case, as shown in FIG. 12, after step S500, but before step S600, a determination is made in an added step S550 whether, in view of the current correlation function value point, the location of the peak portion has been sufficiently identified. If not, operation returns to step S400 for analysis of the next correlation function value point of the sparse set. If so, operation continues to step S600, where the higher-resolution set of correlation function value points to be determined for locating the correlation function peak offset position is determined, and then to step S700, where the determined higher-resolution set is analyzed, similarly to the steps S600 and S700 of FIG. 11.

It should further be appreciated that, in various variations of step S550, operation continues to return to step S400 until a first correlation function value point in the peak portion is found, until a predetermined number of correlation function value points in the peak portion are found, until the correlation function value points of the sparse set that lie within the peak width of the peak portion to either side of the first correlation function value point to be determined as lying within the peak portion have also been determined, or until the width of the peak portion 420 has been spanned. Thus, in various variations of step S550, a plurality of the correlation function value points of the sparse set that could potentially lie within the peak portion are determined before operation continues to step S600. This is advantageous when determining the particular correlation function value points to be included in the higher-resolution set of such points determined and analyzed in step S600.

It should be appreciated that the flowcharts outlined above in FIGS. 11 and 12 can also be modified to incorporate any of the various variations outlined above with respect to FIGS. 5–8 to allow for multiple instances of steps S400 and S500 with different sparse sets of the correlation function value points to be determined and analyzed in each such stage, and/or to modify the comparison performed to determine the correlation function value in each such step S400 as outlined above with respect to FIG. 8. It should also be appreciated that the exemplary methods shown in FIGS. 11 and 12 and their additional variations as described above are usable indistinguishably with both one-dimensional offsets and two-dimensional offsets, as one of ordinary skill in the art would readily understand. Due to the large number of such combinations, specific flowcharts for each such potential combination are not included herein. However, in view of the discussion of FIGS. 5–10 set forth above, one of ordinary skill in the art would readily understand the particular steps to be performed in such modifications of the exemplary embodiments of the methods according to this invention outlined in FIGS. 11 and 12 to implement such variations.

Figure 13:
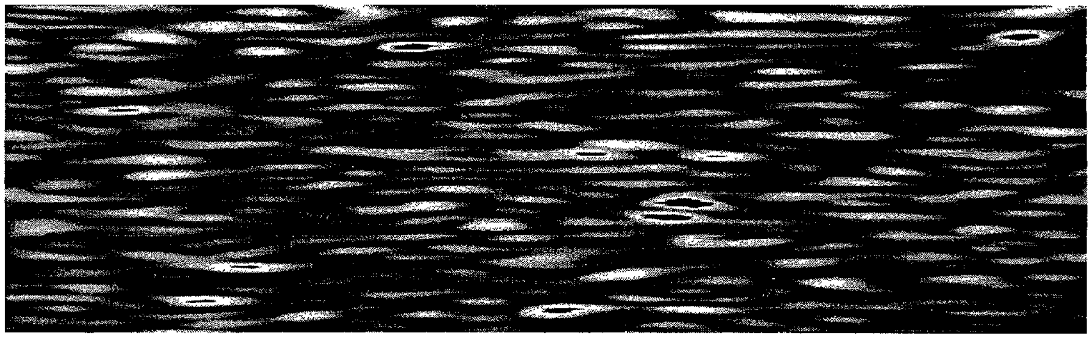
FIG. 13 shows a first exemplary embodiment of smeared high-spatial-frequency image where the surface to be imaged moves relative to the image capture system along a single dimension.
Figure 14:
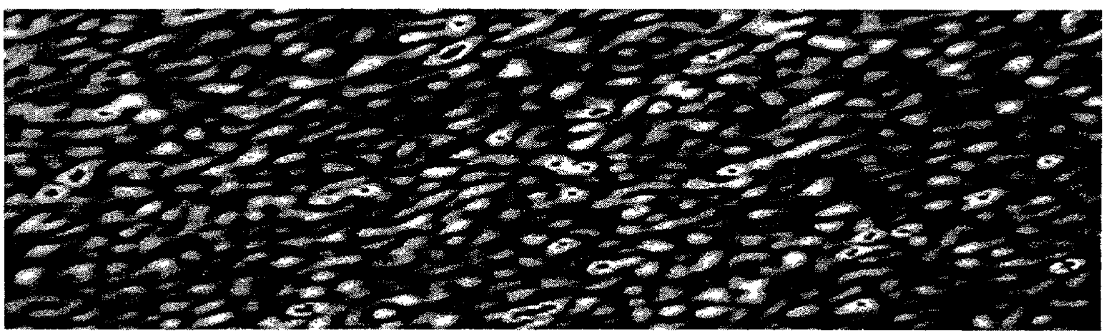
FIG. 14 shows a second exemplary embodiment of a smeared high-spatial-frequency image, where the surface to be imaged moves relative to the image capture system in two dimensions.
Figure 15:
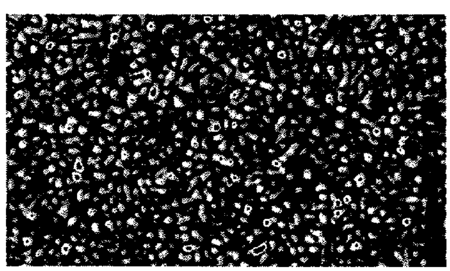
FIG. 15 shows one exemplary embodiment of an unsmeared high-spatial-frequency image.

FIGS. 13 and 14 show two exemplary embodiments of "smeared" high-spatial-frequency images. Conventionally, in the image correlation art, such smeared images are considered highly undesirable, as the smearing distorts the images relative to an unsmeared image, such as that shown in FIG. 15. However, as used in this invention, an image is "smeared" when the product of the smear speed and the exposure time is non-negligible relative to the size of the pixels of the captured image. In general, the smear will be non-negligible when the smear is discernable, appreciable and/or measureable, such as that shown in FIGS. 13 and 14. Smearing is conventionally believed to significantly distort the shape and location of the correlation function peak, and thus interfere with the determination of the actual displacement between the reference and displaced images. However, it should be appreciated that for image features which are on the order of the pixel size of the image capture device, any image captured while the object being imaged is moving at a significant rate relative to the image capture device will have some degree of smearing.

In general, the amount of smearing S of any image feature compared to a stationary image is:

$$S=v\cdot t_s; \tag{5}$$

where:

v is the velocity vector for a two-dimensional offset (v will be a scalar velocity for a one-dimensional offset); and $t_s$ is the shutter time (or the strobe time of a light source).

In particular, the amount of smear S in an image can be determined from the peak portion of an auto-correlation function for that image. In particular, it should be appreciated that to determine the amount of smear S, only a single image is required. The auto-correlation function R(p) for a given pixel displacement (p) for a one-dimensional displacement is:

$$R(p)=\left[\sum_{n=1}^{N}\left(\sum_{m=1}^{M}I_1(m,n)*I_1(p+m,n)\right)\right] \tag{5}$$

Similarly, the auto-correlation function R(p,q) for a given pixel displacement (p,q) for a two-dimensional displacement is:

$$R(p,q)=\left[\sum_{n=1}^{N}\left(\sum_{m=1}^{M}I_1(m,n)*I_1(p+m,q+n)\right)\right] \tag{6}$$

In practice, since the auto-correlation peak of a given image is centered about the p=0 displacement for a one-dimensional offset, or the p=q=0 displacement for a two-dimensional offset, it is not necessary to determine R(p) or R(p,q) for all potential offset values. Rather, R(p) or R(p,q) can be determined only for those offsets, or even only a sparse set of those offsets, that lie within the one- or two-dimensional peak portion of the correlation function that is centered around the (0) or (0,0) offset location. Also, it should be appreciated that it is not necessary to use the full image to determine R(p) or R(p,q). Rather, a sub-area of the full image can be used to determine R(p) or R(p,q). Using less than the full image, as discussed above with respect to FIGS. 6 and 7, will substantially reduce the computation time.

Figure 16:
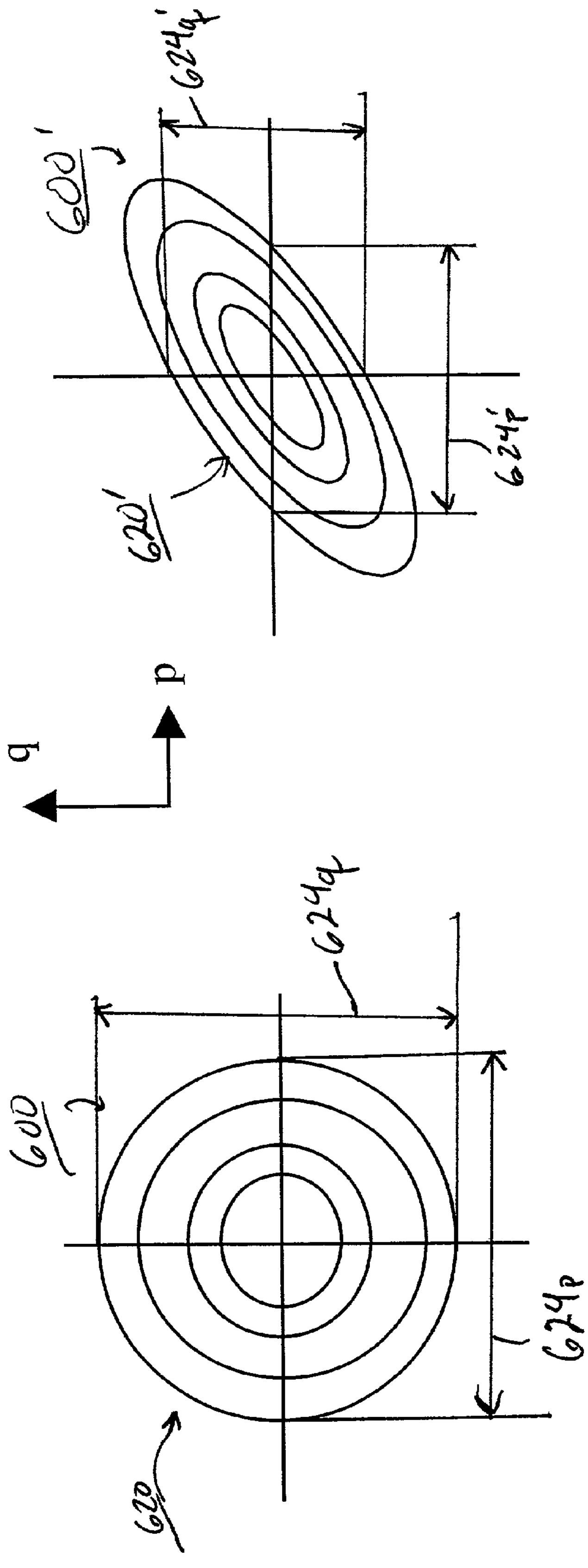
FIG. 16 shows contour plots of the two-dimensional auto-correlation function for an unsmeared image and a smeared image.

FIG. 16 shows the contour plot for the peak portion 620 of the two-dimensional correlation function 600 of an unsmeared image and the contour plot for the peak portion 620' of the two-dimensional correlation function 600' for a smeared image. Of course, it should be appreciated that, in actuality, these correlation functions are not continuous, as the data points are separated by pixel units of the image array used to capture the unsmeared and smeared images.

Figure 17:
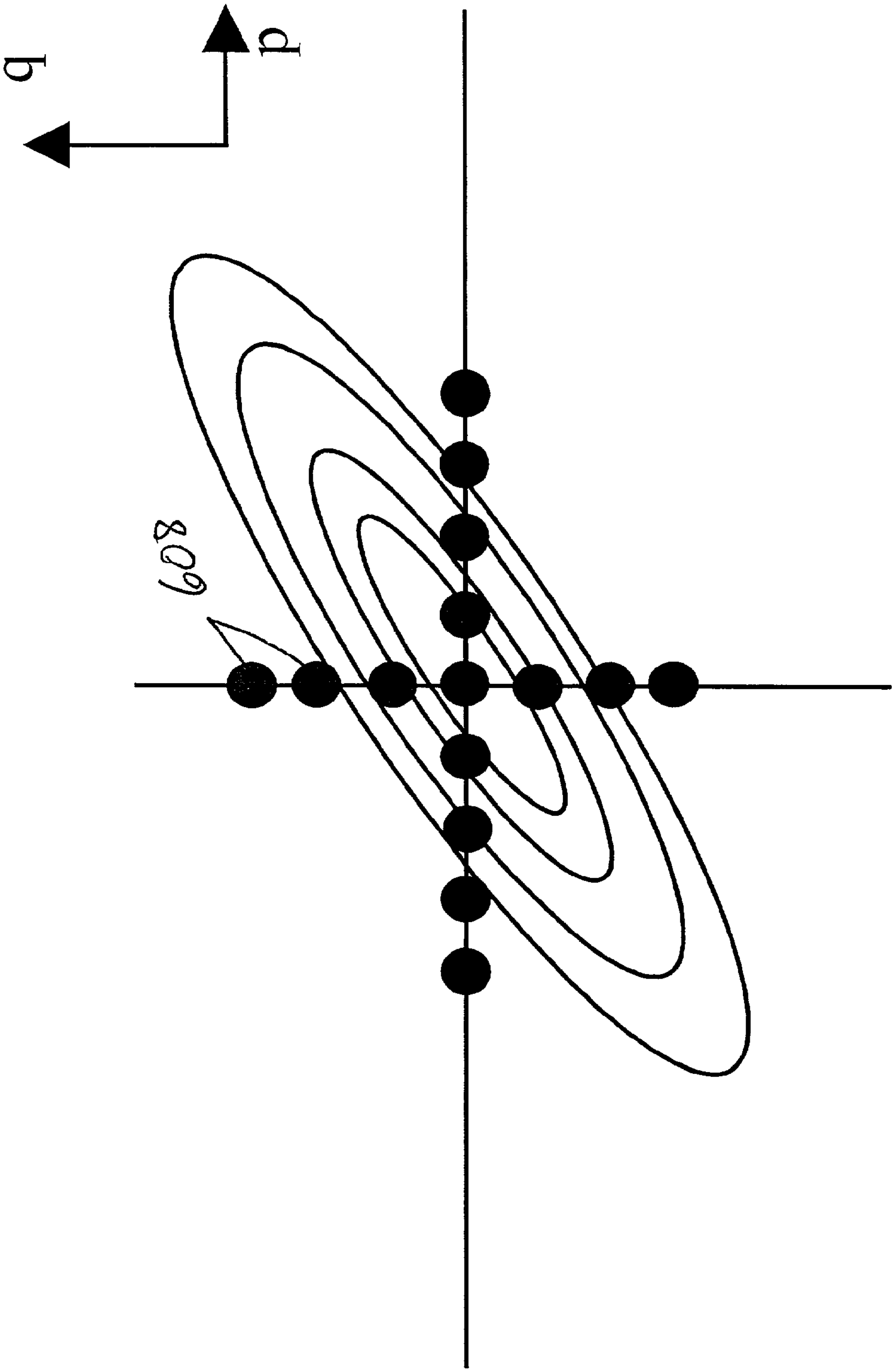
FIG. 17 illustrates the correlation function value points used to determine the smear amount for a two-dimensional auto-correlation function.

One exemplary embodiment of a fast technique according to this invention for determining the smear vector for a two-dimensional translational offset (or the scalar smear amount for a one-dimensional offset) without calculating all of the correlation function value points that lie within the peak portion of the correlation function, and without using all of the array pixels, is to use one row $N_x$ to determine a correlation function along the column direction (p) and one column $M_y$ to determine a correlation function along the row direction. That is, the row $N_x$ is correlated to itself for various pixel displacements along the column direction (p) and the column $M_y$ is correlated to itself for displacements along the row direction (q). The result of determining this sparse set of correlation function value points is to effectively compute R(p,q) along the p and q directions, as shown by the correlation function value points 608 in FIG. 17. However, it should be appreciated that, in practice, to improve the signal-to-noise ratio for any given correlation function value point 608 of FIG. 17, it may be desirable to use more than one row N and/or more column M. In general, one to five such rows N or columns M can reasonably be used for image features on the order of the pixel size.

Once the correlation function value points 608 along the p and q directions have been determined, the widths 624*p*' and 624*q*' of the peak portion 620' can be determined based on the values of these correlation function points 608. Then, the smear in any direction may be determined based on a vector combination of the widths 624*p*' and 624*q*' of the peak portion 620' along the p and q directions, respectively.

It should be appreciated that the direction of the maximum length vector combination of the widths 624*p*' and 624*q*' of the peak portion 620' represents the direction of motion occurring at the time the smeared image was captured, that is, this is the direction of the smear vector v. Thus, the orthogonal direction, or the direction of the minimum length vector combination of the widths 624*p*' and 624*q*' of the peak portion 620', is a direction of no relative motion. The difference between these two orthogonal vector lengths then corresponds to the actual smeared amount.

The foregoing analysis also applies to one-dimensional offset imaged by a two dimension array. However, for application where the offset is always along a defined array axis, the minimum length combination vector may always be along one array direction, and will often be a known amount. Thus, for motion restricted to shift the image along the p direction, for example, correlation function value points are determined only for offsets along the p direction. The amount of smear is then determined based on the motion-dependent width 424 of the peak portion 420 of the correlation function along the p direction, and the known minimum vector length along the q direction.

Once the smear vector v is determined, it is then possible to predict the approximate relative location of the displaced image 310 relative to the smeared reference image 300, assuming that a distance-to-smear function is available. It should be appreciated that this distance-to-smear function can be measured or can be predicted based on the smear relationship $S=v\cdot t_s$ and a known time elapsed between acquisition of the smeared reference image 300 and the displaced image 310.

It should also be appreciated that this technique assumes that the acceleration during and after the analyzed smeared image is captured is not too large. That is, this technique is degraded by large accelerations that occur between acquiring the smeared reference image and the displaced image. However, by performing the exact same analysis on both the smeared reference image and the displaced image, rather than performing it on only one of the smeared reference image or the displaced image, and then comparing the smear results from the reference and displaced images, it is possible to determine and at least partially adjust for large accelerations.

However, it should be appreciated that while the smear vector v for a one or two-dimensional offset determined according to the previous discussion indicates a line direction, the smear vector actually describes a line along which the motion has occurred, but does not indicate which direction along the line the motion occurred. Accordingly, the smear magnitude (for a one-dimensional offset) or the smear magnitude and line direction (for a two-dimensional offset) can be used to approximately locate two candidate or potential positions of the peak portion 420 or 620 of the one-dimensional or two-dimensional correlation functions 400 and 600, respectively. By knowing the approximate candidate or potential locations in which to search for the correlation function peak, it is possible to avoid determining the correlation function values for correlation function value points that lie away from the approximate candidate or potential locations of the correlation function peak, and thus find the peak with a reduced number of operations.

Alternatively, the displacement determined in an immediately previous displacement determination can be used to select the polarity of the smear direction, so that only a single approximate location for the peak portion 420 or 620 will need to be searched. That is, assuming the acceleration is not too large following the previous displacement determination, the direction of that displacement can be use to eliminate one of the two candidate or potential locations.

Thus, once the approximate locations of the peak portion 420 or 620 is identified using the smear amount and/or direction, a limited range of correlation function value points 402 or 606 that includes just the correlation function value points 402 or 606 that lie around the approximately determined correlation function peak offset position can be determined and analyzed. In various applications, the smear procedures set forth above may isolate the approximately determined correlation function peak offset position with sufficient accuracy that there is little utility in further applying the sparse search procedures outlined above. In such cases all the correlation function value points 402 or 606 that lie in the limited range around the approximately determined correlation function peak are analyzed as in the '671 application. Because only those correlation function value points that are likely to be used in determining the actual offset position according to the various techniques disclosed in the '671 application are determined, the system resources required to determine the offset position are significantly reduced relative to having to search the entire correlation space of the correlation function 400 or 600.

However, in other applications, the smear procedures set forth above may isolate the approximately determined correlation function peak offset position more crudely, and the limited range may increase significantly. Also, in the case of no distinguishable smear the limited range must be set to a maximum. In such cases, the smear technique outlined above can be combined with any of the various exemplary embodiments and/or variations of the sparse set of correlation function value points technique outlined previously to even further reduce the amount of system resources necessary to locate the offset position. That is, as outlined above, the smear magnitude or smear vector only approximately locates the position of the correlation function peak and the peak portion 420 or 620 of the one-or two-dimensional correlation functions 400 and 600, respectively. Thus, using the information about the approximate location of the peak portion 420 or 620 provided by the smear magnitude or smear vector, respectively, a sparse set of correlation function value points 402 or 606 can be dynamically determined to allow the approximate location of the peak portion 420 or 620, and the correlation peak 422 or 622, respectively, to be determined with greater accuracy and/or resolution.

Then, as outlined above, a farthest correlation function value point **402*b* or 606*b* of the sparse set of correlation function value points 402 or 606 and the surrounding correlation function value points 402 or 606, within the peak portion 420 or 620 around that farthest correlation function value 402*b* or 606*b*** are determined. Next, any of the various techniques outlined above to determine the full set of correlation function value points usable for the techniques outlined in the '671 application can be used. In this way, even fewer system resources are necessary by using this three-stage technique that combines the smear technique and the sparse set technique.

Figure 18:
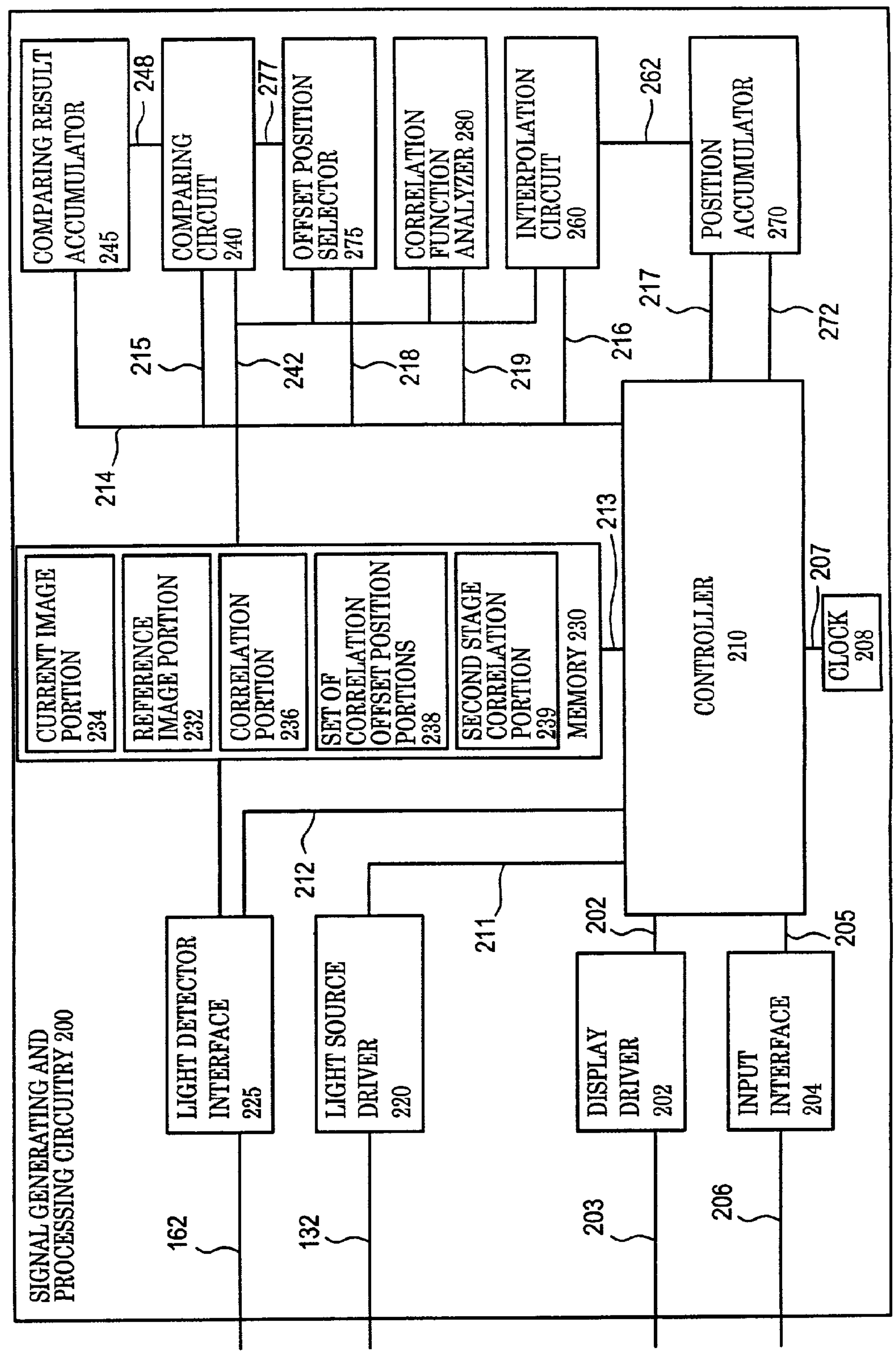
FIG. 18 is a block diagram outlining a first exemplary embodiment of a signal generating and processing circuitry of an image-based optical position transducer suitable for providing images and for determining image displacements according to this invention.

FIG. 18 is a block diagram outlining in greater detail one exemplary embodiment of the signal generating and processing circuitry 200 shown in FIG. 1. As shown in FIG. 18, the signal generating and processing circuitry 200 includes a controller 210, a light source driver 220, a light detector interface 225, a memory 230, a comparing circuit 240, a comparison result accumulator 245, an interpolation circuit 260, a position accumulator 270, a display driver 201, an optional input interface 204, a clock 208, an offset position selector 275, and a correlation function analyzer 280.

The controller 210 is connected to the light source driver 220 by a signal line 211, to the image detector interface 225 by a signal line 212, and to the memory 230 by a signal line 213. Similarly, the controller 210 is connected by signal lines 214–218 to the comparing circuit 240, the comparison result accumulator 245, the interpolation circuit 260, the position accumulator 270, and the offset position selector 275, respectively. Finally, the controller 210 is connected to the display driver 201 by a control line 202 and, if provided, to the input interface 204 by a signal line 205. The memory 230 includes a reference image portion 232, a current image portion 234, a correlation portion 236, and a set of correlation offset positions portion 238, and a second stage correlation portion 239.

In operation, the controller 210 outputs a control signal over the signal line 211 to the light source driver 220. In response, the light source driver 220 outputs a drive signal to the light source 130 over the signal line 132. Subsequently, the controller 210 outputs a control signal to the image detector interface 225 and to the memory 230 over the signal lines 212 and 213 to store the signal portions received over the signal line 164 from the light detector 160 corresponding to each of the image elements 162 into the current image portion 234. In particular, the image values from the individual image elements 162 are stored in a two-dimensional array in the current image portion 234 corresponding to the positions of the individual image elements 162 in the array 166.

Once an image is stored in the reference image portion 232, the controller 210 waits the appropriate fixed or controlled time period before outputting the control signal on the signal line 211 to the light source driver 220 to drive the light source 130. The image detector interface 225 and the memory 230 are then controlled using signals on the signal lines 212 and 213 to store the resulting image in the current image portion 234.

Next, under control of the controller 210, the offset position selector 275 accesses the set of correlation offset positions portion 238. The set of correlation offset positions portion 238 stores data defining the set of sparse correlation function value points to be used during a first stage to approximately locate the peak portion 420 or 620 of the one or two-dimensional correlation function 400 or 600. It should be appreciated that the sparse set of correlation value points 402 or 606 stored in the set of correlation offset positions portion 238 can be predetermined, as outlined above. Alternatively, the sparse set of correlation function value points 402 or 606 can be dynamically determined, or can be an ordered list of correlation function value points to be determined in order as outlined above.

Regardless of how the sparse set of correlation function value points 402 or 606 is determined, the offset position selector 275, under control of the controller 210, selects a first correlation function value point from the sparse set of correlation function value points stored in the set of correlation offset positions portion 238. The offset position selector 275 then outputs a signal on a signal line 277 to the comparing circuit 240 that indicates the p dimension offset (for a one-dimensional correlation function 400) or the p and q dimension offsets (for a two-dimensional correlation function 600) to be used by the comparing circuit 240 when comparing the displaced image stored in the current image portion 234 to the reference image stored in the reference image portion 234.

Then, the controller 210 outputs a signal on the signal line 214 to the comparing circuit 240. In response, the comparing circuit 240 inputs an image value for a particular pixel from the reference image portion 232 over a signal line 242 and inputs the image value for the corresponding pixel, based on the offset values received from the offset position selector 275 for the current one of the sparse set of correlation function value points 402 or 606, from the current image portion 234 over the signal line 242. The comparing circuit 240 then applies a correlation algorithm to determine a comparison result. Any appropriate correlation technique, either known or later-developed, can be used by the comparing circuit 240 to compare the reference image stored in the reference image portion 232 with the current image stored in the current image portion 234 on a pixel-by-pixel basis based on the current offset. The comparing circuit 240 outputs the comparison result on a signal line 248 to the comparison result accumulator 245 for the current correlation offset.

Once the comparing circuit 240 has extracted and compared the image value for at least some of the image elements 162 from the reference image portion 232 and compared them to the corresponding image values stored in the current image portion 234, and applied the correlation technique and output the comparison result to the comparison result accumulator 245, the value stored in the comparison result accumulator 245 defines the correlation value, corresponding to the current values received from the offset position selector 275 for the current one of the sparse set of correlation function value points 402 or 606, in predetermined units. The controller 210 then outputs a signal over the signal line 215 to the comparison result accumulator 245 and to the memory 230 over the signal line 213. As a result, the correlation algorithm result stored in the comparison result accumulator 245 is output and stored in the correlation portion 236 of the memory 230 at a location corresponding to the current values received from the offset position selector 275 for the current one of the sparse set of correlation function value points 402 or 606. The controller 210 then outputs a signal on the signal line 215 to clear the results stored in the correlation portion 236.

The controller 210 then outputs a signal on the signal line 215 to clear the result accumulator 245. Once all of the comparisons for all of the correlation function value points of the sparse set of correlation function value points stored in the set of correlation offset position portions 238 have been performed by the comparing circuit 240, and the results accumulated by the comparison result accumulator 245 and stored in the correlation portion 236 under control of the controller 210, the controller 210 outputs a control signal over the signal line 218 to the correlation function analyzer 280.

The correlation function analyzer 280, under control of the controller 210, analyzes the correlation function values stored in the correlation portion 236 to identify those correlation function value points 402 or 606 of the sparse set of correlation function value points 402 or 602 that lie within the peak portion 420 or 620 of the correlation function 400 or 600, respectively. The correlation function analyzer 280 then outputs, under control of the controller 210, a number of correlation function value points 402 or 606 that lie within the peak portion 420 or 620, respectively, and that lie at least in a portion of the peak portion 420 or 620 that surrounds the farthest correlation function value point 402*b* or 606*b* to be stored in the second stage correlation portion 239. The controller 210 then outputs a signal on the signal line 215 to clear the results stored in the correlation portion 236.

Then, under control of the controller 210, the comparing circuit 240 determines correlation function values for each of the correlation function value points 402 or 606 stored in the second stage correlation portion 239. Once all of the comparisons for all of the correlation function value points 402 or 606 stored in the second stage correlation portion 239 have been performed by the comparing circuit 240 and the results accumulated by the comparison result of the accumulator 245 and stored in the correlation portion 236 under control of the controller 210 the controller 210 outputs a control signal over the signal line 216 to the interpolation circuit 260.

In response, the interpolation circuit 260 inputs the correlation results stored in the correlation portion 236 over the signal line 242, and identifies correlation values coinciding with a peak or trough of the correlation function and interpolates between the identified correlation function value points in the vicinity of the peak/trough of the correlation function to determine the peak offset value or image displacement value with sub-pixel resolution. The interpolation circuit 260 then outputs, under control of the signal over the signal line 216 from the controller 210, the determined estimated sub-pixel displacement value on a signal line 262 to the position accumulator 270. The position accumulator 270, under control of the signal over the signal line 217 from the controller 210, adds the estimated displacement value to the displacement value for the current reference image stored in the reference image portion. The position accumulator 270 then outputs the updated position displacement to the controller 210 over the signal line 272.

In response, the controller 210 may output the updated displacement value to the display driver 201, if provided, over the signal line 218. The display driver 201 then outputs drive signals over the signal line 203 to the display device 107 to display the current displacement value.

One or more signal lines 205, if provided, allow an interface between an operator or a cooperating system and the controller 210. If provided, the input interface 204 may buffer or transform the input signals or commands and transmit the appropriate signal to the controller 210.

It should also be appreciated that the controller 210 can control the offset position selector 275 to select a particular sparse set of correlation function value points from a plurality of such sets stored in the set of correlation offset positions portions 238 to enable a multistage, rather than a two-stage, analysis technique. It should also be appreciated that the controller 210 can control the comparison circuit 240 to compare only subsets of the pixels of the reference and displaced images stored in the reference image portion 232 and the current image portion 234, as outlined above with respect to FIGS. 6 and 7.

Figure 19:
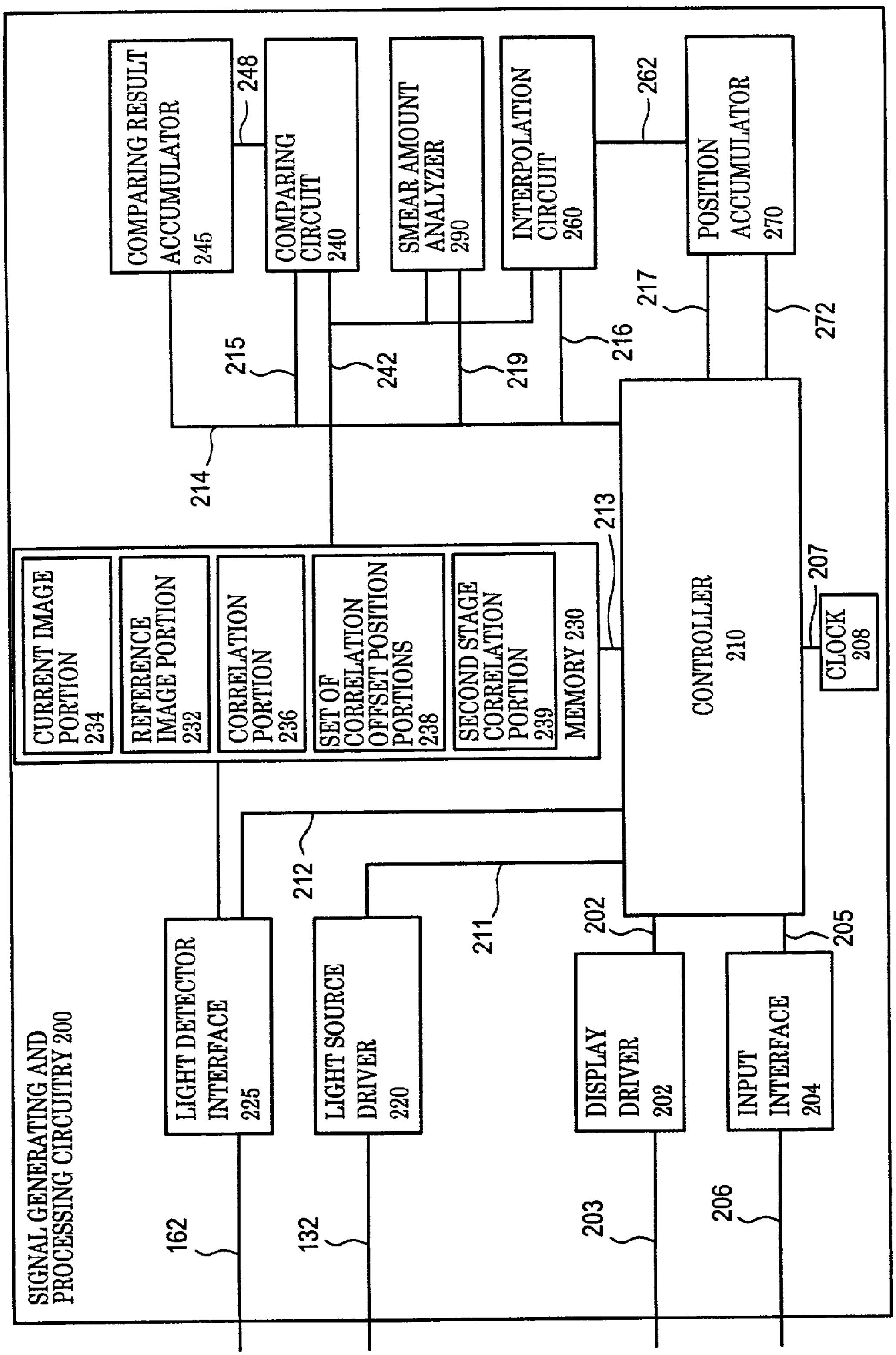
FIG. 19 is a block diagram outlining a second exemplary embodiment of a signal generating and processing circuitry of an image-based optical position transducer suitable for providing images and for determining image displacements according to this invention.

FIG. 19 is a block diagram outlining in greater detail a second exemplary embodiment of the signal generating and processing circuitry 200 shown in FIG. 1. As shown in FIG. 19, the signal generating processing circuitry 200 is substantially similar to the first exemplary embodiment of the signal generating and a processing circuitry 200 shown in FIG. 18, except that in this second exemplary embodiment, the signal generating and processing circuitry 200 omits the offset position selector 275, but includes a smear amount analyzer 290. In operation, in contrast to the first exemplary embodiment of the signal generating and processing circuitry shown in FIG. 18, the controller 210 operates the light source driver 220 and/or the light detector 160 to create a smeared image, which is stored in the reference image portion 232.

Then, before waiting the appropriate fixed or controlled time to obtain the displaced image to be stored in the current image portion 234, the controller 210 outputs a signal on the signal line 214 to the comparing circuit 240 to generate the data necessary to determine an auto-correlation function for the smeared image stored in the reference image portion 232. In general, the comparing circuit 240 and the comparison result accumulator 245 are controlled as outlined above by the controller 210 to generate, accumulate and store correlation function values in the correlation portion 236 for the correlation function value points 608 shown in FIG. 17 for a two-dimensional offset, or for a corresponding set of correlation function offset points 402 for a one-dimensional offset.

Then, under control of the controller 210, the smear amount analyzer 290 analyzes the correlation function value points stored in the correlation portion 236 to determine the one-dimensional width 424 of the peak portion 420 or the two-dimensional widths $\mathbf{624}_p$ and $\mathbf{624}_q$ of the two-dimensional peak portion 620. The smear amount analyzer 290 then determines the smear amount from the determined one-dimensional width 424 or the two-dimensional widths 624*p* and 624*q* of the peak portions 420 or 620, respectively. The smear amount analyzer 290 then determines one or two approximate locations for the peak portion 420 or 620 of the correlation function to be determined from a comparison of the smeared image stored in the reference image portion 232 and a displaced image 310 to be captured and stored in the current portion 234.

Based on these determined approximate locations for the peak portion 420 or 620 determined by the smear amount analyzer 290, the sets of correlation function value points stored in the set of correlation offset positions portions 238 and/or the second stage correlation portion 239 are determined by the smeared amount analyzer 290. Then, under control of the controller 210, the determined sets of correlation function value points are stored in one or both of the set of correlation offset positions portions 238 and/or the second stage correlation portion 239.

Then, the controller 210, after waiting the appropriate fixed or control time, obtains the displaced image and stores it in the current image portion 234. Then, as outlined above, the controller 210 controls the comparing circuit 240, the result of accumulator 245 and the interpolation set circuit 260, based on the set of correlation function value points stored in the second stage correlation portion 239, to determine the actual offset position.

Of course, it should be appreciated that the first and second embodiments of theses signal generating and processing circuitry 200 outlined above and shown in FIGS. 18 and 19 can be combined. In this case, after the smear amount analyzer 290 determines the one or two possible approximate locations for the peak portion 420 or 620, rather than storing a full-set of correlation function value points to be used by the comparing circuit 240 and stored in the second stage correlation portion 239, the smear amount analyzer 290 dynamically determines at least one sparse set of correlation function value points 402 or 606 based on the possible approximate locations for the peak portions 420 or 620, which are stored, under control of the controller 210, in the set of correlation offset positions portion 238. Then, after the displaced image is captured and stored in the current image portion 234, the controller 210, as outlined above with respect to the first exemplary embodiment of the signal generating and processing circuitry 200, operates the comparing circuit 240 based on that at least one sparse set of correlation function value points 402 or 606 as outlined above with respect to the first exemplary embodiment of the signal generating and processing circuitry 200 shown in FIG. 18.

The signal generating and processing circuitry 200 is, in various exemplary embodiments, implemented using a programmed microprocessor or microcontroller and peripheral integrated circuit elements. However, the signal generating and processing circuitry 200 can also be implemented using a programmed general purpose computer, a special purpose computer, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing any one or more of the methods outlined above can be used to implement the signal generating and processing circuitry 200.

In FIGS. 18 and 19, the memory 230 in the signal generating and processing circuitry 200 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rerewriteable optical disk and disk drive, a hard drive, flash memory, a memory stick or the like. Similarly, the non-alterable or fixed memory can be implemented using any one or more of ROM, PROM, EPROM, EEPROM, an optical ROM disk, such as a CD-ROM or DVD-ROM disk, and associated disk drive, or the like.

Thus, it should be understood that each of the controller 210 and the various other circuits 220, 225 and 240–290 of the signal generating and processing circuitry 200 can be implemented as portions of a suitably programmed general purpose computer, macroprocessor or microprocessor. Alternatively, each of the controller 210 and the other circuits 220, 225 and 240–290 shown in FIGS. 18 and 19 can be implemented as physically distinct hardware circuits within an ASIC, or using a FPGA, a PDL, a PLA or a PAL, or using discrete logic elements or discrete circuit elements. The particular form each of the circuits 220, 225, 240–290 of the signal generating and processing circuitry 200 will take is a design choice and will be obvious and predicable to those skilled in the art.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for determining a location of a peak of a first correlation function generated by comparing a first image to a second image, at least one of the first and second images acquired such that the image features of that at least one image are smeared, the method comprising:

comparing one of the at least one smeared image to itself at a first plurality of offset positions, the first plurality of offset positions corresponding to a first set of correlation function value points of an auto-correlation function that are distributed around a zero-offset position of that smeared image relative to itself;

analyzing values of the plurality of correlation function value points of the first set to identify at least one width value for a peak portion of the auto-correlation function for the smeared image;

determining at least a smear magnitude based at least partially on the at least one width of the peak portion of the auto-correlation function for the smeared image;

determining, based at least on the determined smear magnitude, at least one potential location of the peak of the first correlation function to a first resolution.

2. The method of claim 1, wherein:

the first and second images can be offset relative to each other along a single dimension that is parallel to an axis of the image; and comparing the smeared image to itself at the first plurality of offset positions comprises comparing the smeared image to itself at plurality of offset positions that are distributed along the single dimension around the zero-offset position.

3. The method of claim 2, wherein analyzing values of the plurality of correlation function value points of the first set to identify at least one width value comprises identifying a single width value of the peak portion along the single dimension.

4. The method of claim 3, wherein determining at least the smear magnitude comprises determining at least one of a ratio of the single width value to a corresponding width value of the peak of the auto-correlation function for a representative unsmeared image along the single dimension and a difference between the single width value and the corresponding width value.

5. The method of claim 2, wherein determining at least one potential location of the peak of the first correlation function comprises:

determining a smear speed based on the determined smear magnitude and an exposure time of the smeared image;

determining an offset distance based on the smear speed and a time interval between the first image and the second image; and determining at least one potential peak portion of the first correlation function in a vicinity based on the determined offset distance.

6. The method of claim 5, wherein determining at least one potential peak portion of the first correlation function in a vicinity based on the determined offset distance comprises:

determining a first potential peak portion of the first correlation function offset from the zero offset position of the first image relative to the second image in a first direction along the single dimension; and determining a second potential peak portion of the first correlation function offset from the zero offset position of the first image relative to the second image in a second direction, opposite the first direction, along the single dimension.

7. The method of claim 5, wherein determining at least one potential peak portion of the first correlation function in a vicinity based on the determined offset distance comprises:

determining a direction of a previously-determined image displacement; and selecting one of the at least one potential peak portion based on the determined direction.

8. The method of claim 1, wherein:

the first and second images can be offset relative to each other by a vector that can be decomposed into two orthogonal components; and comparing the smeared image to itself at the first plurality of offset positions comprises comparing the smeared image to itself at plurality of offset positions that are distributed in both of the first dimension and the second dimension around the zero-offset position.

9. The method of claim 8, wherein analyzing values of the plurality of correlation function value points of the first set to identify at least one width value comprises:

identifying a first width value of the peak portion along the first dimension; and identifying a second width value of the peak portion along the second dimension.

10. The method of claim 9, wherein determining at least the smear magnitude comprises determining a smear magnitude and a smear line direction.

11. The method of claim 10, wherein determining the smear magnitude and line direction comprises:

determining a direction and a length of a maximum length vector combination of the first width value of the peak portion along the first dimension and the second width value of the peak portion along the second dimension; and determining at least a length of a minimum length vector combination of the first width value of the peak portion along the first dimension and the second width value of the peak portion along the second dimension;

wherein the smear magnitude is the difference between the maximum length vector and the minimum length vector and the smear line direction is the aligned with the direction of the maximum length vector.

12. The method of claim 11, wherein determining at least one potential location of the peak of the first correlation function comprises:

determining a smear speed based on the determined smear magnitude and an exposure time of the smeared image;

determining an offset distance based on the smear speed and a time interval between the first image and the second image; and determining at least one potential peak portion of the first correlation function based on the determined offset distance along the smear line direction.

13. The method of claim 12, wherein determining at least one potential peak portion of the first correlation function based on the determined offset distance along the smear line direction comprises:

determining a first potential peak portion of the first correlation function offset positively from a zero offset position of the first image relative to the second image along the smear line direction; and determining a second potential peak portion of the first correlation function offset negatively from a zero offset position of the first image relative to the second image along the smear line direction.

14. The method of claim 8, wherein comparing the smeared image to itself at plurality of offset positions that are distributed in both of the first dimension and the second dimension around the zero-offset position comprises:

comparing the smeared image to itself at plurality of offset positions that are distributed along the first dimension around the zero-offset position with no offset along the second dimension; and comparing the smeared image to itself at plurality of offset positions that are distributed along the second dimension around the zero-offset position with no offset along the first dimension.

15. The method of claim 1, further comprising:

comparing the first image to the second image at a second plurality of offset positions, the second plurality of offset positions corresponding to a second set of correlation function value points selected based on the determined at least one potential peak portion; and determining the location of the peak of the correlation function based on at least some of the second set of correlation function value points.

16. The method of claim 15, further comprising determining a position offset between the first and second images based on the determined location of the peak of the correlation function.

17. The method of claim 1, further comprising:

comparing the first image to the second image at at least one of a second plurality of offset positions, the second plurality of offset positions corresponding to a second set of correlation function value points of the correlation function that are sparsely distributed in at least one potential peak portion of the correlation function, each potential peak portion lying around one of the determined at least one potential location of the peak;

analyzing a value of at least one correlation function value point of the second set to identify at least one correlation function value point of the second set of correlation function value points that lies within a true peak portion of the correlation function;

comparing the first image to the second image at a third plurality of offset positions, the third plurality of offset positions corresponding to a third set of correlation function value points selected based on at least one of the at least one correlation function value point of the second set of correlation function value points that lies within the true peak portion, the third set of correlation function value points densely distributed within at least a region of the true peak portion; and determining the location of the peak of the correlation function based on at least some of the third set of correlation function value points.

18. The method of claim 17, wherein:

the true peak portion of the correlation function has at least one characteristic extent in a correlation function space; and determining the second set of correlation function value points comprises selecting the correlation function value points of the second set of correlation function value points such that the location of the correlation function value points of the second set in correlation function space are sparsely distributed throughout the location of the determined at least one potential peak portion of the correlation function in correlation function space such that the correlation function value points within each of the at least one potential peak portion are spaced apart by a distance that is certain to locate at least one of the correlation function value points of the second set within the at least one characteristic extent of the true peak portion of the correlation function in the correlation function space.

19. The method of claim 17, wherein comparing the first image to the second image at at least one of the second set of correlation function value points comprises comparing the first image to the second image to the at least one of the second set of correlation function value points according to an ordered list of the second set of correlation function value points.

20. The method of claim 17, wherein analyzing the value of at least one correlation function value point of the second set comprises comparing the value of the at least one correlation function value point of the second set to a determined threshold value.

21. The method of claim 17, wherein selecting the third set of correlation function value points based on at least one of the at least one correlation function value point of the second set of correlation function value points that lies within the true peak portion comprises:

identifying one of the at least one correlation function value point of the second set of correlation function value points that lies within the true peak portion that is farthest from an extent for the correlation function values of the correlation function value points that lie outside of the true peak portion; and selecting a number of contiguous correlation function value points of the correlation function surrounding the identified farthest correlation function value point as the third set of correlation function value points.

22. The method of claim 17, wherein selecting the third set of correlation function value points based on at least one of the at least one correlation function value point of the second set of correlation function value points that lies within the true peak portion comprises:

identifying one of the at least one correlation function value point of the second set of correlation function value points that lies within the true peak portion that is farthest from an extent for the correlation function values of the correlation function value points that lie outside of the true peak portion;

identifying a first one of the second set of correlation function value points that is adjacent to the identified farthest correlation function value point on a first side;

identifying a second one of the second set of correlation function value points that is adjacent to the identified farthest correlation function value point on a second side; and selecting the correlation function value points of the correlation function that lie between the first and second adjacent correlation function value points as the third set of correlation function value points.

23. The method of claim 17, wherein selecting the third set of correlation function value points based on at least one of the at least one correlation function value point of the second set of correlation function value points that lies within the true peak portion comprises:

identifying one of the at least one correlation function value point of the second set of correlation function value points that lies within the true peak portion that is farthest from an extent for the correlation function values of the correlation function value points that lie outside of the true peak portion;

identifying a first one of the second set of correlation function value points that is adjacent to the identified farthest correlation function value point on a first side;

identifying a second one of the second set of correlation function value points that is adjacent to the identified farthest correlation function value point on a second side; and selecting, as the second set of correlation function value points, the correlation function value points of the correlation function that lie within a range of the identified farthest correlation function value point defined based on at least one of the first and second adjacent correlation function value points.

24. The method of claim 17, further comprising determining a position offset between the first and second images based on the determined location of the peak of the correlation function.

25. The method of claim 1, further comprising obtaining the first and second images using an image-correlation optical position transducer having a readhead that is movable relative to a member having an image-determining surface.

26. A recording medium that stores a control program, the control program executable on a computing device usable to receive data corresponding to a first image and a second image suitable for determining a correlation function, at least one of the first and second images acquired such that the image features of that at least one image are smeared, the control program including instructions comprising:

instructions for comparing one of the at least one smeared image to itself at a first plurality of offset positions, the first plurality of offset positions corresponding to a first set of correlation function value points of an auto-correlation function that are distributed around a zero-offset position of that smeared image relative to itself instructions for analyzing values of the plurality of correlation function value points of the first set to identify at least one width value for a peak portion of the auto-correlation function for the smeared image;

instructions for determining at least a smear magnitude based at least partially on the at least one width of the peak portion of the auto-correlation function for the smeared image;

instructions for determining, based at least on the determined smear magnitude, at least one potential location of the peak of the first correlation function to a first resolution;

readhead that is movable relative to a member having an image-determining surface.

* * * * *